United States Patent
Koziarz et al.

(10) Patent No.: US 10,095,962 B2
(45) Date of Patent: Oct. 9, 2018

(54) Y-Z BANDING/LAYERING FOR COMPLEX PAGE RIP

(71) Applicant: CANON KABUSHIKI KAISHA, Tokyo (JP)

(72) Inventors: Krzysztof Adam Koziarz, Denistone (AU); Stuart James Warren, Naremburn (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/976,200

(22) Filed: Dec. 21, 2015

(65) Prior Publication Data

US 2017/0177984 A1    Jun. 22, 2017

(51) Int. Cl.
| | | |
|---|---|---|
| G06K 15/00 | (2006.01) | |
| G06K 15/02 | (2006.01) | |
| G06F 3/06 | (2006.01) | |

(52) U.S. Cl.
CPC ......... *G06K 15/1863* (2013.01); *G06F 3/067* (2013.01); *G06F 3/0613* (2013.01); *G06F 3/0653* (2013.01); *G06F 3/0683* (2013.01); *G06K 15/1807* (2013.01); *G06K 15/1813* (2013.01); *G06K 15/1823* (2013.01); *G06K 15/1836* (2013.01); *G06K 15/1857* (2013.01)

(58) Field of Classification Search
CPC .................................................. G06K 15/1863
See application file for complete search history.

(56) References Cited

U.S. PATENT DOCUMENTS

| | | | |
|---|---|---|---|
| 5,524,186 A | 6/1996 | Campbell | |
| 5,588,095 A * | 12/1996 | Dennis | G06F 3/1296 |
| | | | 358/1.16 |
| 6,657,635 B1 | 12/2003 | Hutchins et al. | |
| 7,113,302 B2 | 9/2006 | Reddy et al. | |
| 8,669,987 B2 | 3/2014 | Redshaw et al. | |
| 9,098,933 B2 | 8/2015 | Morphet | |
| 2010/0220106 A1 | 9/2010 | Morphet | |
| 2015/0109314 A1 | 4/2015 | Redshaw | |

\* cited by examiner

*Primary Examiner* — King Poon
*Assistant Examiner* — Michael Burleson
(74) *Attorney, Agent, or Firm* — Canon USA, Inc. I.P. Division

(57) ABSTRACT

A method for managing memory use in a graphics processing system receives a plurality of objects to be reproduced on an output medium, the output medium being divided into a plurality of bands. Objects falling within a band are stored in a corresponding local band memory and shared objects intersecting the band and at least one other band in at least one shared memory arena. Each shared memory arena is associated with a band counter defining the number of bands referencing said shared memory arena. The local band memory is associated with a data structure storing a shared memory arena identifier of the at least one shared memory arena where the shared objects intersecting the band are stored. The method facilitates release of the at least one shared memory arena in response to rasterizing the band selected for rasterizing based on the plurality of shared memory arena identifiers.

18 Claims, 13 Drawing Sheets

Y-Z BANDING/LAYERING FOR COMPLEX PAGE RIP

TECHNICAL FIELD

The present disclosure relates generally to the field of graphics processing and, in particular, to a method, apparatus and system for memory management and scheduling tasks in a multi-threaded raster image processor (RIP). The present disclosure also relates to a computer program product including a computer readable medium having recorded thereon a computer program for scheduling tasks in a multi-threaded RIP.

BACKGROUND

In commercial printing, printing speeds are in the thousands of pages-per-minute (ppm), typically measured in meters/second or monthly throughput. Such printing speeds are achieved using commodity hardware, and configuring software to have a suitable high level of parallelism.

Speeds of printing machines are increasing, as commodity hardware becomes cheaper and more powerful, customer demands increase, and processing becomes increasingly centralised on a global scale. Cloud-based services are an example of such trends. However, with improved hardware, deficiencies in scalability of existing software are exposed, and a need to adapt software and create new algorithms arises. Particularly, in order to take advantage of such parallelism, a process must typically be broken down into "tasks", which are largely independent and able to be executed in parallel. Additionally, the tasks need to be of generally consistent complexity to improve memory allocation and memory usage patterns.

In the printing of a page, graphical objects arrive in z-order, and can be organised into y-dimension bands, where each band is formed by one or more consecutive scan lines. Y-bands of the page can be rendered in parallel to increase printing speeds. Given that objects can span multiple bands, to process each band independently, all objects overlapping a particular band need to be accessible by a thread rendering that band. One approach to achieve this is to have a shared display list memory for storing all objects on the page. In this case, each y-band is associated with a set of references pointing to portions of the shared display list memory where objects intersecting that band are stored. However, when the printing system runs out of memory, such an approach necessitates rendering all objects stored in the shared display list memory, even though only particular bands caused the system run out of memory. Therefore, simple y-bands may be converted prematurely and unnecessarily. Given that complexity of page description language (PDL) documents tend to vary significantly throughout a page, it is likely that threads rendering different y-bands of the page have different finishing times, therefore a load balancing of the y-band conversion tasks is difficult to achieve.

One method to solve this problem is to identify objects which fall entirely within a y-band or sub-region and objects which span multiple y-bands or sub-regions, so that objects falling entirely within one y-band or sub-region can be stored locally and objects spanning multiple y-bands can be stored in a shared memory. The selection of sub-region for rendering is based on the amount of memory that can be freed by the process of rendering. This solution is suitable for display rendering, but does not address the problem of fastest first page out in print rendering. The solution is also prone to memory fragmentation as the memory is divided into sub-regions.

Another approach, splits the total memory into multiple large blocks and uses bitmasks in each block to indicate the region numbers for which data is stored in the block. Upon rendering of any region, the bitmasks for each block of memory referenced is updated so that the rendered region no longer references a given block, to determine which blocks can be freed by a particular render. However, such a complex solution still does not provide any guidance on how regions should be scheduled for rendering.

Another approach prioritises regions (tiles) for rendering based on their complexity: e.g. as determined by the amount of data in the region, from largest to smallest. Again, this solution does not provide a method of scheduling if the multiple regions are to be rendered nor does it resolve the problem of efficient allocation of object data shared by multiple regions.

Thus there is a need to provide a system and a method for graphics processing, particularly of a print job, including the management of the rasterization tasks so as to utilise the system memory efficiently and to result in the fast first page out.

SUMMARY

According to one aspect of the present disclosure, there is provided a method for managing memory use in a graphics processing system, the method comprising: receiving a plurality of objects to be reproduced on an output medium, the output medium being divided into a plurality of bands; storing data for objects intersecting a band in a corresponding band memory, wherein the band memory comprises objects falling within said band and references to shared objects intersecting more than one band; storing the shared objects in a plurality of shared memory arenas, each shared memory arena being associated with a band counter defining the number of bands referencing said shared memory arena, wherein each band is associated with a global memory metric determined based on shared memory arenas storing shared objects referenced in the corresponding band memory and band counters corresponding to said shared memory arenas, such that at least two bands are associated with different global memory metrics; selecting a band for rasterizing based on the associated global memory metric, wherein the selected band is rasterized using data from the corresponding band memory and plural identified shared memory arenas storing shared objects referenced in said band memory; and in response to rasterizing the selected band, decrementing band counters for the identified shared memory arenas thereby to allow release of the shared memory arenas.

According to another aspect of the present disclosure, there is provided a method for managing memory use in a graphics processing system, the method comprising: receiving a plurality of objects to be reproduced on an output medium, the output medium being divided into a plurality of bands; storing data for objects intersecting a band in a corresponding band memory, wherein the band memory comprises objects falling within said band and references to shared objects intersecting more than one band; storing the shared objects in a plurality of shared memory arenas, each shared memory arena being associated with a band counter defining the number of bands referencing said shared memory arena; determining, for at least one band, a plurality of shared memory arenas storing shared objects referenced in the corresponding band memory; determining a global memory metric for each band based on band counters associated with the determined shared memory arenas, such that at least two bands are associated with different global memory metrics; selecting a band for rasterizing based on the determined global memory metric, wherein the selected band is rasterized using data from the corresponding band memory and the determined plurality of shared memory arenas; and in response to rasterizing the selected band, decrementing band counters for the determined shared memory arenas thereby to allow release of the shared memory arenas.

Desirably the plurality of shared memory arenas comprises a first shared memory arena and a second shared memory arena, the second shared memory arena being allocated when the first memory arena reaches a predetermined threshold, wherein the first memory arena is marked as read only when the predetermined threshold is reached In a preferred implementation, the selecting a band for rasterizing is further based on a band attribute metric associated with the band, the band attribute metric is determined based on the objects intersecting said band.

Desirably the selecting is further based on prioritising release of those shared memory arenas having a smaller band counter.

Preferably the selecting a band for rasterizing is further is triggered by a number of objects intersecting said band determined while interpreting a PDL document describing the received plurality of objects.

Advantageously, the selecting is further based on prioritising rendering of top-most bands.

In some implementations, the global memory metric is determined by the total amount of referenced shared memory arenas.

Preferably the global memory metric is determined based on an associated z-order of corresponding shared memory arenas.

Advantageously a plurality of bands are rasterized in parallel.

In specific implementations, the method further comprises rasterizing the selected band in response to detecting that a combined memory allocated to the band memories and the shared memory arenas is above a predetermined threshold.

Desirably the rasterizing can comprises selecting a renderer from a plurality of renderers, wherein a first renderer is selected if the number of objects referred to in the band memory exceeds a predetermined threshold, otherwise, a second renderer is selected.

In certain examples, the method may further comprise, in response to rasterizing a band, releasing corresponding band memory and those shared memory arenas for which band counter has reached zero.

Desirably the first renderer generates an intermediate pixel aligned representation from the object data stored in the corresponding band memory and corresponding shared memory arenas.

Preferably the second renderer skips the step of generating an intermediate pixel aligned representation and proceeds to pixel generation from an associated display list.

According to another aspect of the present disclosure, provided is a method for managing memory use in a graphics processing system, the method comprising: receiving a plurality of objects to be reproduced on an output medium, the output medium being divided into a plurality of bands; storing objects falling within a band in a corresponding local band memory and storing shared objects intersecting said band and at least one other band in at least one shared memory arena, each shared memory arena being associated with a band counter defining the number of bands referencing said shared memory arena, wherein the local band memory is associated with a data structure storing a shared memory arena identifier of the at least one shared memory arena where the shared objects intersecting the band are stored; and facilitating release of the at least one shared memory arena in response to rasterizing the band selected for rasterizing based on the plurality of shared memory arena identifiers.

Other aspects are also disclosed including computerized apparatus for performing the methods and programs and storage media for instruction performance of the methods by a processor.

BRIEF DESCRIPTION OF THE DRAWINGS

At least one embodiment of the invention will now be described with reference to the following drawings, in which.

DETAILED DESCRIPTION INCLUDING BEST MODE

Methods are described as implemented in a multi-threaded RIP, and more specifically a builder module that constructs a printable representation of each page. Such methods can be applied to other multi-threaded applications.
Context
(Printing System)

Figure 1:
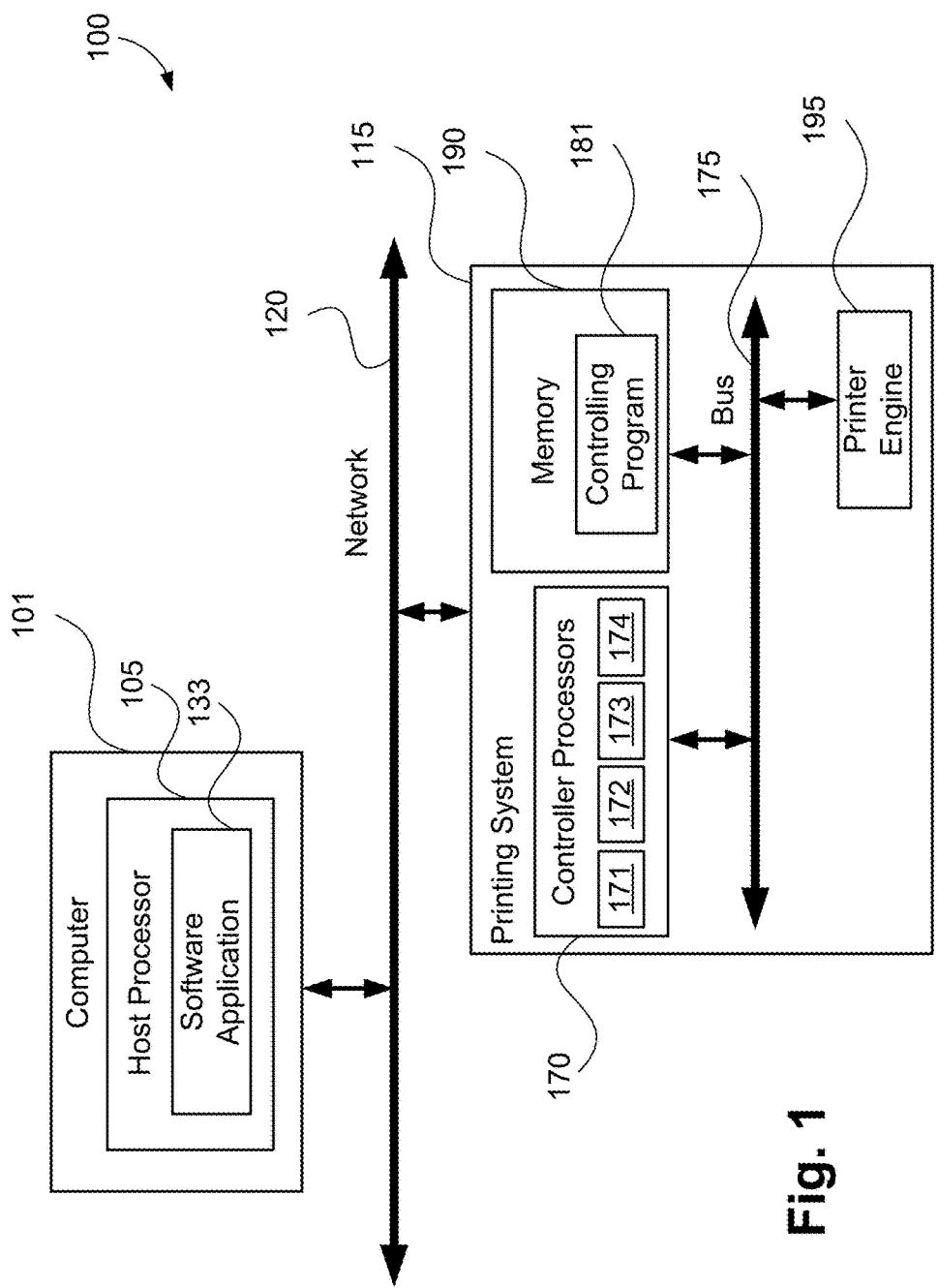
FIG. 1 is a schematic block diagram of a multi-processor printing system for rendering a document according to the present disclosure.

FIG. 1 shows a schematic block diagram of a pixel rendering system 100 for rendering graphic objects. The render processing performed by the system 100 is ultimately for printing but typically includes display screen rendering, for example using a print preview function available in many applications. The pixel rendering system 100 includes a computer module 101 connected to a printer system 115 through a communications network 120. The network 120 may be a wide-area network (WAN), such as the Internet, a cellular telecommunications network, or a private WAN. The network 120 may comprise multiple computers. Alternatively, the network 120 may be a single computer module 101 and a printing system (e.g., 115). Alternatively, the computer 101 and printing system 115 may be connected by a cable used to communicate between devices via ports, such as a USB, serial, parallel or FireWire port.

The computer module 101 comprises at least one host processor 105 for executing a software application 133, such as a word processor or graphical software application.

The printing system 115 comprises plurality of controller processors 170. As shown in the example of FIG. 1, the controller processors 170 comprise four processors 171, 172, 173 and 174, for executing one or more software code modules forming a controlling program 181 which is stored in a memory 190. Alternatively, the controller processors 170 may comprise processors that take the form of single-core CPUs, GPUs, or any other form of computer processor such as field-programmable gate arrays (FPGAs). In another alternative, the controller processors 170 may comprise a mixture of the various kinds of processors described above.

The printing system 115 also has a printer engine 195 coupled to the controller processors 170, via an interconnected bus 175. The controlling program 181 accepts a printable document 201 produced by the software application 133 and produces, via execution on the controller processors 170, pixel data values for printing. The pixel data values may then be stored in the memory 190 and reproduced as pixels by the printer engine 195, for example. The controlling program 181 may be executed by the controller processors 170 in one or more threads of execution. A thread is formed by a number of instructions or steps that are executed in sequence by one of the processors 171-174. The controlling program 181 will be further described in detail below with reference to FIG. 2.

Figure 3A:
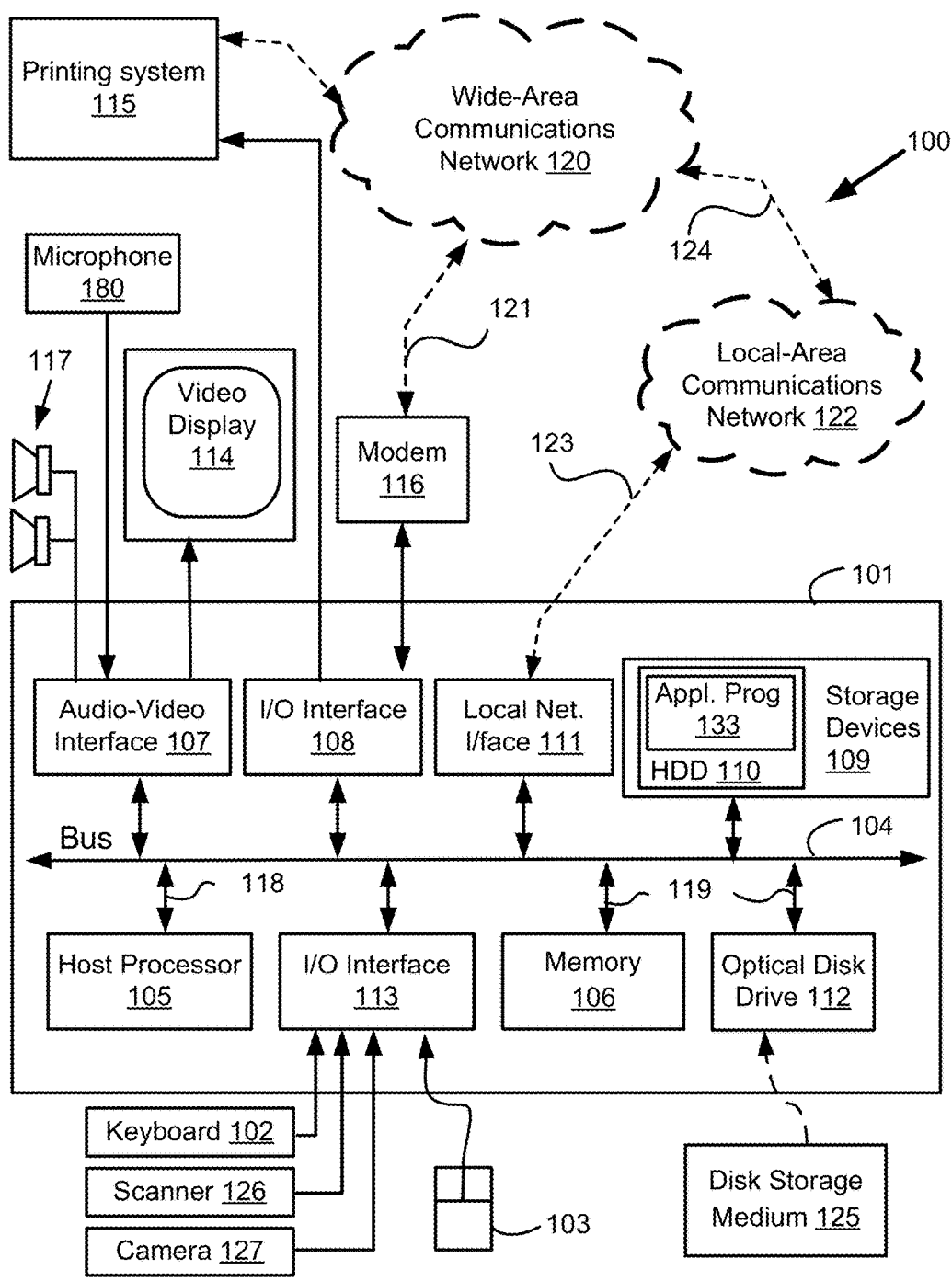
FIGS. 3A and 3B collectively form a schematic block diagram of the general purpose computer system of FIG. 1 in more detail.

As seen in more detail in FIG. 3A, the pixel rendering system 100 includes: the computer module 101 having associated input devices such as a keyboard 102, a mouse pointer device 103, a scanner 126, a camera 127, and a microphone 180; and output devices including the printing system 115, a display device 114 and loudspeakers 117. An external Modulator-Demodulator (Modem) transceiver device 116 may be used by the computer module 101 for communicating to and from the communications network 120 via a connection 121. The communications network 120 may be a wide-area network (WAN), such as the Internet, a cellular telecommunications network, or a private WAN. Where the connection 121 is a telephone line, the modem 116 may be a traditional "dial-up" modem. Alternatively, where the connection 121 is a high capacity (e.g., cable) connection, the modem 116 may be a broadband modem. A wireless modem may also be used for wireless connection to the communications network 120.

The computer module 101 typically includes the at least one processor unit 105, and a memory unit 106. For example, the memory unit 106 may have semiconductor random access memory (RAM) and semiconductor read only memory (ROM). The computer module 101 also includes a number of input/output (I/O) interfaces including: an audio-video interface 107 that couples to the video display 114, loudspeakers 117 and microphone 180; an I/O interface 113 that couples to the keyboard 102, mouse 103, scanner 126, camera 127 and optionally a joystick or other human interface device (not illustrated); and an interface 108 for the external modem 116 and for direct connection to the printing system 115. In some implementations, the modem 116 may be incorporated within the computer module 101, for example within the interface 108. The computer module 101 also has a local network interface 111, which permits coupling of the computer module 101 via a connection 123 to a local-area communications network 122, known as a Local Area Network (LAN). As illustrated in FIG. 3A, the local communications network 122 may also couple to the wide network 120 via a connection 124, which would typically include a so-called "firewall" device or device of similar functionality. The local network interface 111 may comprise an Ethernet™ circuit card, a Bluetooth™ wireless arrangement or an IEEE 802.11 wireless arrangement; however, numerous other types of interfaces may be practiced for the interface 111. The printing system 115 may alternatively couple to the computer module 101 via the wide area network 120 as illustrated, or to the local network 122 (not illustrated).

The I/O interfaces 108 and 113 may afford either or both of serial and parallel connectivity, the former typically being implemented according to the Universal Serial Bus (USB) standards and having corresponding USB connectors (not illustrated). Storage devices 109 are provided and typically include a hard disk drive (HDD) 110. Other storage devices such as a floppy disk drive and a magnetic tape drive (not illustrated) may also be used. An optical disk drive 112 is typically provided to act as a non-volatile source of data. Portable memory devices, such optical disks (e.g., CD-ROM, DVD, Blue ray Disc™), USB-RAM, portable, external hard drives, and floppy disks, for example, may be used as appropriate sources of data to the system 100.

The components 105 to 113 of the computer module 101 typically communicate via an interconnected bus 104 and in a manner that results in a conventional mode of operation of the computer system 100 known to those in the relevant art. For example, the processor 105 is coupled to the system bus 104 using a connection 118. Likewise, the memory 106 and optical disk drive 112 are coupled to the system bus 104 by connections 119. Examples of computers on which the described arrangements can be practised include IBM-PC's and compatibles, Sun Sparcstations, Apple Mac™ or alike computer systems.

Methods described below may be implemented using the system 100 wherein one or more steps of the processes of FIGS. 2 and 4 to 12, to be described, may be implemented as one or more code modules of the software application program 133 executable within the system 100. One or more of the steps of the described methods may be effected by instructions 131 (see FIG. 3B) in the software 133 that are carried out within the system 100.

As also described below, one or more steps of the processes of FIGS. 2 and 4 to 12 to be described, may be implemented as one or more of the code modules forming the controlling program 181 executable within the printing system 115. Again, one or more of the steps of the described methods may be effected by instructions, similar to the instructions 131 in the software 133.

The software instructions 131 implementing the software 133 may be formed as the one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software 133 is typically stored in the HDD 110 or the memory 106. The software is loaded into the system 100 from the computer readable medium, and then executed by the system 100. A computer readable medium having such software or computer program recorded on the computer readable medium is a computer program product. The use of the computer program product in the system 100 preferably effects an advantageous apparatus for implementing the described methods.

In some instances, the application programs 133 may be supplied to the user encoded on one or more CD-ROMs 125 and read via the corresponding drive 112, or alternatively may be read by the user from the networks 120 or 122. Still further, the software can also be loaded into the system 100 from other computer readable media. Computer readable storage media refers to any non-transitory tangible storage medium that provides recorded instructions and/or data to the system 100 for execution and/or processing. Examples of such storage media include floppy disks, magnetic tape, CD-ROM, DVD, Blu-ray Disc™, a hard disk drive, a ROM or integrated circuit, USB memory, a magneto-optical disk, or a computer readable card such as a PCMCIA card and the like, whether or not such devices are internal or external of the computer module 101. Examples of transitory or non-tangible computer readable transmission media that may also participate in the provision of software, application programs, instructions and/or data to the computer module 101 include radio or infra-red transmission channels as well as a network connection to another computer or networked device, and the Internet or Intranets including e-mail transmissions and information recorded on Websites and the like.

The second part of the application program 133 and the corresponding code modules mentioned above may be executed to implement one or more graphical user interfaces (GUIs) to be rendered or otherwise represented upon the display 114, and via which the document intended for printing may be viewed using a print preview function. Through manipulation of typically the keyboard 102 and the mouse 103, a user of the system 100 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 117 and user voice commands input via the microphone 180.

Figure 3B:
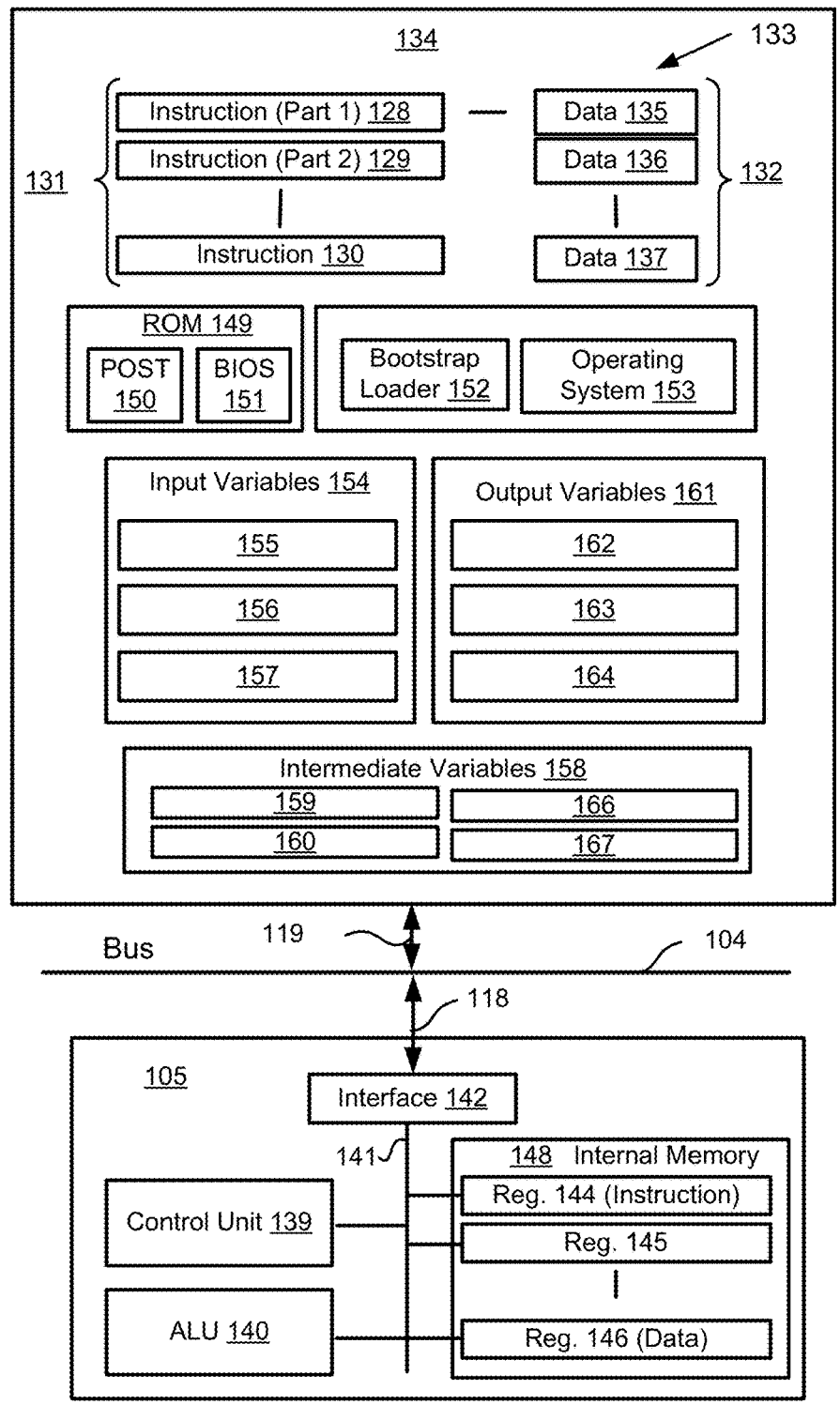

FIG. 3B is a detailed schematic block diagram of the processor 105 and a "memory" 134. The memory 134 represents a logical aggregation of all the memory modules (including the HDD 109 and semiconductor memory 106) that can be accessed by the computer module 101 in FIG. 3A.

When the computer module 101 is initially powered up, a power-on self-test (POST) program 150 executes. The POST program 150 is typically stored in a ROM 149 of the semiconductor memory 106 of FIG. 3A. A hardware device such as the ROM 149 storing software is sometimes referred to as firmware. The POST program 150 examines hardware within the computer module 101 to ensure proper functioning and typically checks the processor 105, the memory 134 (109, 106), and a basic input-output systems software (BIOS) module 151, also typically stored in the ROM 149, for correct operation. Once the POST program 150 has run successfully, the BIOS 151 activates the hard disk drive 110 of FIG. 3A. Activation of the hard disk drive 110 causes a bootstrap loader program 152 that is resident on the hard disk drive 110 to execute via the processor 105. This loads an operating system 153 into the RAM memory 106, upon which the operating system 153 commences operation. The operating system 153 is a system level application, executable by the processor 105, to fulfil various high level functions, including processor management, memory management, device management, storage management, software application interface, and generic user interface.

The operating system 153 manages the memory 134 (109, 106) to ensure that each process or application running on the computer module 101 has sufficient memory in which to execute without colliding with memory allocated to another process. Furthermore, the different types of memory available in the system 100 of FIG. 3A need to be used properly so that each process can run effectively. Accordingly, the aggregated memory 134 is not intended to illustrate how particular segments of memory are allocated (unless otherwise stated), but rather to provide a general view of the memory accessible by the system 100 and how such is used.

As shown in FIG. 3B, the processor 105 includes a number of functional modules including a control unit 139, an arithmetic logic unit (ALU) 140, and a local or internal memory 148, sometimes called a cache memory. The cache memory 148 typically includes a number of storage registers 144-146 in a register section. One or more internal busses 141 functionally interconnect these functional modules. The processor 105 typically also has one or more interfaces 142 for communicating with external devices via the system bus 104, using a connection 118. The memory 134 is coupled to the bus 104 using a connection 119.

The application program 133 includes a sequence of instructions 131 that may include conditional branch and loop instructions. The program 133 may also include data 132 which is used in execution of the program 133. The instructions 131 and the data 132 are stored in memory locations 128, 129, 130 and 135, 136, 137, respectively. Depending upon the relative size of the instructions 131 and the memory locations 128-130, a particular instruction may be stored in a single memory location as depicted by the instruction shown in the memory location 130. Alternately, an instruction may be segmented into a number of parts each of which is stored in a separate memory location, as depicted by the instruction segments shown in the memory locations 128 and 129.

In general, the processor 105 is given a set of instructions which are executed therein. The processor 105 waits for a subsequent input, to which the processor 105 reacts to by executing another set of instructions. Each input may be provided from one or more of a number of sources, including data generated by one or more of the input devices 102, 103, data received from an external source across one of the networks 120, 102, data retrieved from one of the storage devices 106, 109 or data retrieved from a storage medium 125 inserted into the corresponding reader 112, all depicted in FIG. 3A. The execution of a set of the instructions may in some cases result in output of data. Execution may also involve storing data or variables to the memory 134.

The methods described below may use input variables 154, which are stored in the memory 134 in corresponding memory locations 155, 156, 157. The disclosed methods produce output variables 161, which are stored in the memory 134 in corresponding memory locations 162, 163, 164. Intermediate variables 158 may be stored in memory locations 159, 160, 166 and 167.

Referring to the processor 105 of FIG. 3B, the registers 144, 145, 146, the arithmetic logic unit (ALU) 140, and the control unit 139 work together to perform sequences of micro-operations needed to perform "fetch, decode, and execute" cycles for every instruction in the instruction set making up the program 133. Each fetch, decode, and execute cycle comprises:

(a) a fetch operation, which fetches or reads an instruction 131 from a memory location 128, 129, 130;

(b) a decode operation in which the control unit 139 determines which instruction has been fetched; and (c) an execute operation in which the control unit 139 and/or the ALU 140 execute the instruction.

Thereafter, a further fetch, decode, and execute cycle for the next instruction may be executed. Similarly, a store cycle may be performed by which the control unit 139 stores or writes a value to a memory location 132.

One or more steps or sub-processes in the processes of FIGS. 2 and 4 to 12 may be associated with one or more segments of the program 133 and is performed by the register section 144, 145, 147, the ALU 140, and the control unit 139 in the processor 105 working together to perform the fetch, decode, and execute cycles for every instruction in the instruction set for the noted segments of the program 133.

As described above, one or more steps of the processes of FIGS. 2 and 4 to 12, to be described, may be implemented as one or more code modules of the controlling program 181 executable within the printing system 115. The code modules forming the controlling program 181 are typically stored in the memory 190. The code modules forming the controlling program 181 may be loaded into the printing system 115 from the computer readable medium, and then executed by the printing system 115. A computer readable medium having such software or computer program recorded on the computer readable medium is a computer program product. The use of the computer program product in the printing system 115 preferably effects an advantageous apparatus for implementing one or more steps of the described methods.

In some instances, the controlling program 181 may be supplied to the user encoded on one or more CD-ROMs, similar to the CD-ROMs 125, or alternatively may be read by the user from the networks 120 or 122. Still further, software code modules for the controlling program 181 may also be loaded into the system 100 from other computer readable media.

The code modules implementing the controlling program 181 may be executed by the controller processors 170 in a similar manner to the code modules implementing the software application program 133 as described above.

The described methods may alternatively be implemented in dedicated hardware such as one or more integrated circuits performing the functions or sub functions of the described methods. Such dedicated hardware may include graphic processors, digital signal processors, or one or more microprocessors and associated memories.

(Printing Modules)

Figure 2:
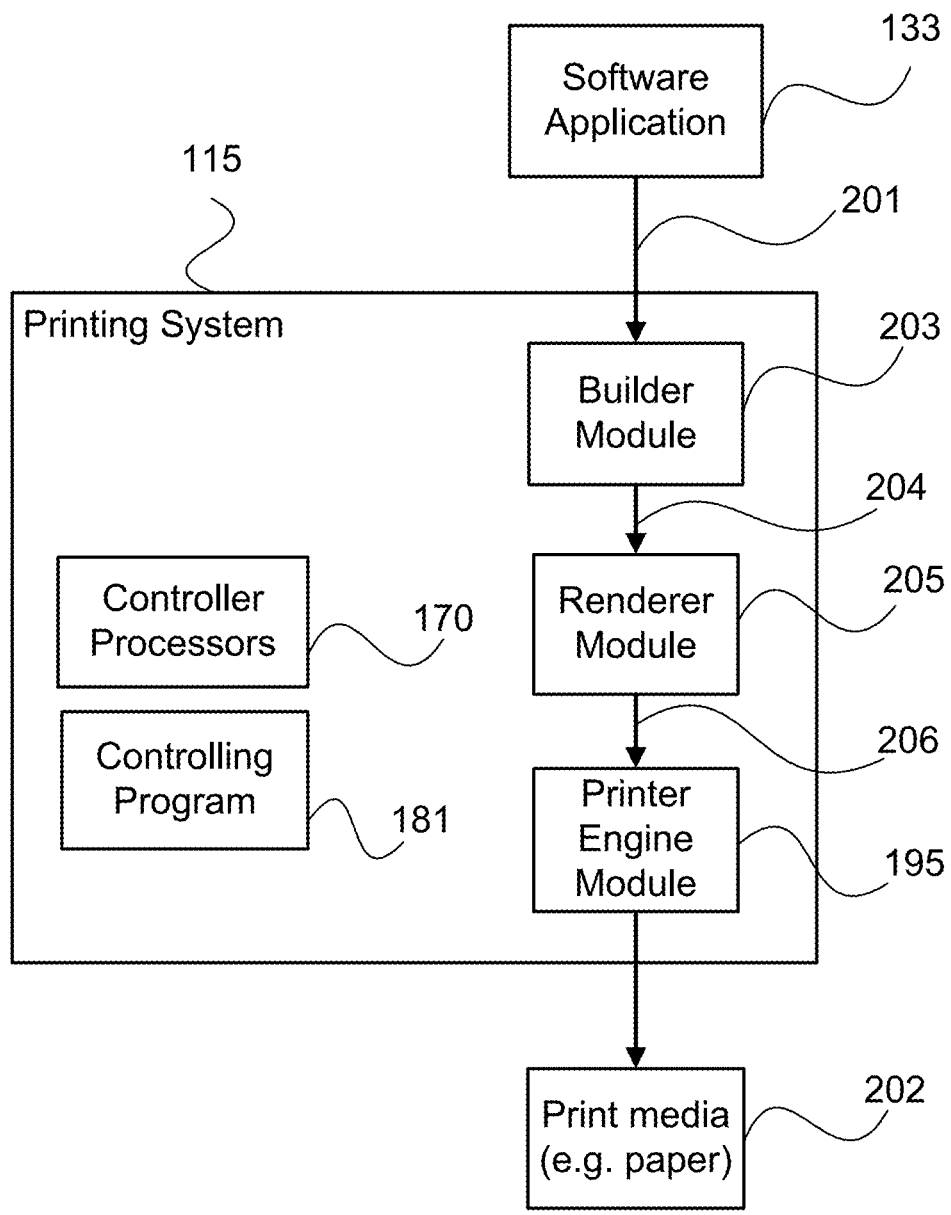
FIG. 2 is a software architecture for the printing system of FIG. 1.

FIG. 2 shows a software architecture for printing a printable document 201 using the printing system 115. Each of the modules 203 and 205 described below may be formed by one or more of the code modules of the controlling program 181.

The software application 133, for example, executing on the computer module 101, provides the printable document 201 to the printing system 115 for printing to an output (print) medium 202, such as a paper sheet. The printable document 201 is typically provided in the form of a description of the printable document 201, the description being specified using a Page Description Language (PDL), such as Adobe® PDF or Hewlett-Packard® PCL. The PDL provides descriptions of graphic objects on each page to be rendered onto the print medium 202 in a rendering (or z) order, as opposed to a raster image (i.e., a bitmap of pixel values) of each page to be printed.

A builder module 203 receives a page of a printable document 201 in PDL form and generates an intermediate representation known as a final y-banded print job 204 of the page. The final y-banded print job 204 is printable data divided into y-bands corresponding to bands of the output print medium, and which can be reproduced by display on the display 114 or by printing by the printer 115. Y-bands are horizontal strips of a page ordered vertically according to their position on the page, the position on the page henceforth referred to as y-order. Y-bands are numbered according to their y-order, from 0 to n, where the first y-band (at the top of the page) is numbered 0 while last y-band (at the bottom of the page) is numbered n. The printing system 115 then uses a renderer module 205 to render the final y-banded print job 204 to pixel data values 206. The pixel data values 206 are printed onto a print medium 202, such as paper, using a printer engine module 195. The printer engine module 195 may, for example, be an electro-photographic engine.

The builder module 203, renderer module 205 and print engine module 195 may reside within a monolithic printing system, such as the system 115. Such arrangement will be henceforth referred to as an integrated system. Alternatively, the builder module 203 can reside on a first device while renderer module 205 and print engine module 195 can reside on a second, separate device. In such an alternative arrangement, the final y-banded print job 204 is sent from the first device to the second device before the renderer module 205 renders the final y-banded print job to pixel data values 206. Such an alternative arrangement will be henceforth referred to as a split system. In one implementation of such a split system, the builder module 203 may be formed within the computer module 101, for example as a printer driver application.

The builder module 203 and renderer module 205 and print engine module 195 may be implemented as one or more code modules of the controlling program 181 which is executed by the controller processors 170 within the printing system 115. The builder module 203 will be described in more detail later with reference to FIG. 4.

Operation of the printing system 115 is similar to that of the computer module 101 in terms of storage and execution of the controlling program 181 by the memory 190 and the controller processors 170, respectively. However, the controlling program 181 is typically multi-threaded with distinct program threads executing on corresponding ones of the multiple processors 171-174 making up the controller processors 170. As such, the foregoing description of the computer module 101 is generally applicable to the printing system 115. Specifically, the controlling program 181 is typically stored on a memory drive (not illustrated) which may be a hard disk drive or semiconductor hard drive. Further, the controlling program 181 may be loaded via an interface connection (e.g., a USB port) or via the network 120.

Returning to FIG. 1, in the pixel rendering system 100, the software application 133 creates printable documents for printing, such as printable document 201. The printable document 201 often contains graphic objects such as text, lines, fill regions, and image data. The software application 133 sends a high-level description of the printable document (e.g., a PDL file) via the network 120 to the controlling program 181 that is executed by the controller processors 170 of the printing system 115. The printable document 201 contains all information required by the printing system 115 to render and print each page of the document.

In alternative arrangements, the printing system 115, the controller processors 170 and controlling program 181, may be resident in separate servers connected to the network 120. In still another alternative arrangement, the printing system 115, the controller processors 170 and controlling program 181 may be resident in a distributed network of servers. In such systems, the raster image representation produced by the controlling program 181 is sent to the printer engine module 195 via a network rather than the bus 175.

The described methods may also be implemented as part of other graphics rendering systems in which an intermediate representation is rendered (e.g., for displaying PDF documents on an LCD display). As such, the described methods are not limited to printing systems.

(ZY-banding vs. YZ-banding Method)

Two methods of generating a final y-banded print job 204 from a sequence of graphic objects 201 will now be described. The order of a sequence of graphic objects on a page is known in the art as z-order, and both methods are required to preserve this order in the way the rendered output 206 is generated.

In one method, referred to as the ZY-banding algorithm, objects in the input page representation are divided into batches. For example, a first batch may contain K objects resting on the page background. A second batch may then contain the remaining objects in the page representation. The z-order of each object in the second batch is higher than the z-order of all objects in the first batch. Objects from the first batch are converted into an equivalent first intermediate y-banded representation consisting of B y-bands. Subsequently, objects from the second batch are converted into an equivalent second intermediate y-banded representation also consisting of B y-bands. Multiple overlapping y-band representations are assigned a z-order relationship consistent with the z-order relationship of the objects from which they were derived. Thus, each y-band in the second intermediate y-banded representation has higher z-order than each y-band in the first intermediate y-banded representation.

Then, in a merging pass, corresponding individual y-band representations from the first intermediate y-banded representation and the second intermediate y-banded representation are respectively merged to form the final y-banded print job 204. In general, the input page representation objects may be divided into more than two batches. If so, more than two intermediate y-banded representations can be merged during the merge pass. Further, if there are more batches than can be efficiently merged in one pass, more than one merging pass may be required. Merging preserves z-ordering, i.e., only the intermediate y-banded representations consecutive in z-order can be merged together.

For an input divided into N batches, the ZY-banding algorithm performs NB y-band conversion operations from the input page representation to the intermediate y-banded representation. The amount of data in each y-band conversion operation may vary as objects in general are not spread evenly on a page. Therefore, the duration and memory requirements of y-band conversion tasks tend to be more non-uniform.

In an alternative method, referred to as the YZ-banding algorithm, objects in the input page representation are individually queued into queues for each of the y-bands intersected by the outline of the object. A queue that reaches a certain size (say, K objects) is converted into an intermediate y-banded representation for the corresponding y-band. Thus, input object data from each y-band is converted into an intermediate y-banded representation, independently of other y-bands. If more than K objects' outlines intersect a given y-band, more than one batch of y-band data will be converted for that given y-band. Therefore, the first intermediate y-banded representation for that y-band will have the lowest z-order. The second and subsequent intermediate y-banded representation for that y-band will have a higher z-order than first intermediate y-banded representation for the given y-band. The intermediate y-banded representations for different y-bands have no order relationship. The intermediate y-banded representations for a given y-band are also called z-layers of that y-band.

If there is more than one intermediate y-banded representation for a given y-band, at least one merging pass will be required for the given y-band. As with ZY-banding, merging preserves intermediate y-banded representation z-order. However, merging within each y-band is done independently of the other y-bands. YZ-banding has an advantage over ZY-banding in that the amount of data in each y-band conversion operation can be a fixed size (such as a predetermined number of objects or a fixed amount of memory) and the duration and memory requirements of y-band conversion tasks thus tend to be more uniform. Furthermore, YZ-banding usually results in fewer y-banding conversion operations than ZY-banding for the same input.

(Builder Tasks)

Figure 4:
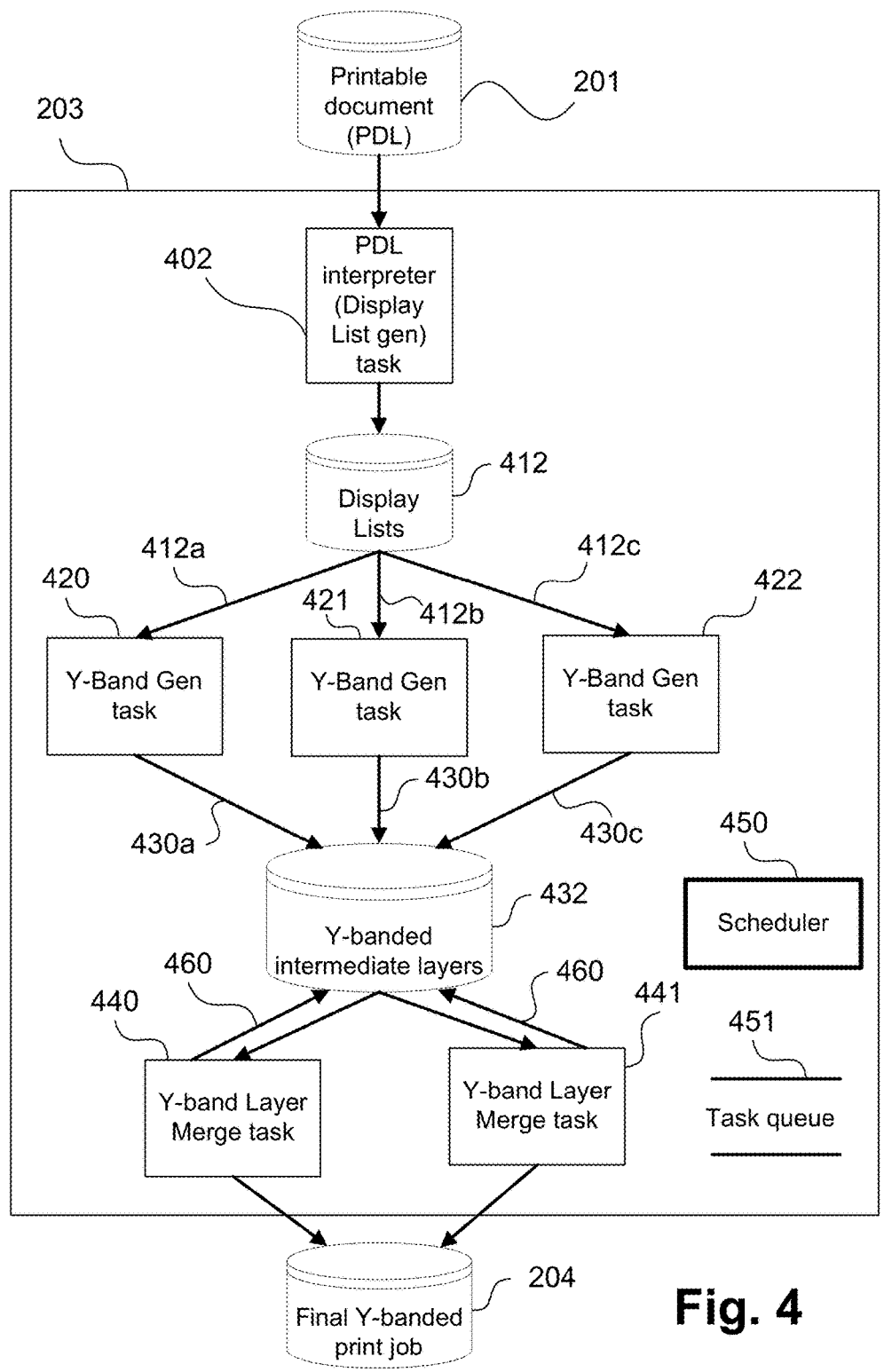
FIG. 4 is a schematic block diagram representation of the tasks and components of the builder module of FIG. 2.

The builder module 203 will now be described in more detail with reference to FIG. 4. The builder module 203 contains or otherwise implements a preferred manner of scheduling tasks according to the present disclosure. The purpose of the builder module 203 is to create (build) the final y-banded print job 204 which is an intermediate representation of a page of the printable document 201 being or to be printed. The term "intermediate representation" refers to a data format which is intermediate between the page description language representation and pixel data of the printable document 201 being printed. Instructions from the page description language representation can be pre-processed into basic commands, which a printer 115 can handle. For example, such basic commands may be generated by decomposing objects into sets of pixel aligned edges and colour data in the form of fills or compositing sequences. In this example, the sets of pixel aligned edges and colour data in the form of fills or compositing sequences constitute the final y-banded print job 204. The builder module 203 includes a PDL interpreter 402 (PDLi) which operates to interpret the PDL document 201 and to build display lists 412 for the document 201. A Task queue 451 is formed to represent a set of tasks created by PDLi 402, being y-band generation (YG) tasks 420-422, and y-band layer merge (YM) tasks 440-441. A Scheduler 450 picks up the tasks and assigns them for execution to physical threads available from a thread pool, as soon as threads become available. Ordinarily, tasks are executed in the order of arrival. However, the scheduler 450 can change the order, as will be described later. As such, each YG task results in a rendering of a band of image data and, by their allocation to multiple threads, permits multiple renderers to operate simultaneously for different bands. The YM tasks subsequently operate to merge image data for individual bands, and again this can be performed simultaneously for multiple bands using multiple renderers implemented using multiple threads.

The PDLi task 402, produces a sequence of graphic objects in z-order. The number of graphical objects on the document page as well as other information, such as each object's bounding box, can be determined from the PDL input 201. The Display lists 412 store the graphic objects produced by the PDL interpreter 402 and may be stored in the memory 190. Display lists 412 comprise a set of y-band display lists, one per y-band. Each y-band display list, also referred to as a display list for a y-band or y-band data, contains a sequence of graphic objects, or references to graphical objects, preferably sorted by the first scan lines on which the graphic objects appear within the y-band. An example of splitting the graphic objects of a page of a printable document 201 into y-band display lists will be described later with reference to FIGS. 5A and 5B.

For each y-band display list in the set of display lists 412, a corresponding YG task (e.g., the task 420) is created. In the example shown in FIG. 4, the PDLi task 402 has split the graphic objects of a page of the printable document 201 into three y-band display lists 412a-412c. Therefore, three YG tasks 420-422 are created. Each YG task (e.g., task 420) receives a y-band display list (e.g. list 412a) and converts that display list to a corresponding y-banded intermediate layer 430a-430c, i.e. an intermediate representation for the y-band display list. Intermediate layers are collected into a set of intermediate layers 432 which are temporarily stored in memory 190 as depicted in FIG. 4. It is appreciated that, subject to the DL document 201, any number of display lists 412 and YG tasks 420-422 may be formed.

A suitable representation for z-layers of y-banded intermediate layers 432 is required that represents graphical data in an intermediate form between display lists 412 and rendered pixels. Furthermore, the representation must support merging of y-band z-layers while correctly preserving compositing operations. Suitable representations include run-based representations and region-based representations. With a run-based representation, the geometric area of the y-band is divided into scan lines, and each scan line into segments, also known as runs. With a region-based representation, the geometric area of the y-band is divided into two-dimensional portions known as regions. The lengths and positions of the runs, or the shapes of the regions, are derived from the outlines of the graphic objects received from PDL interpreter 402. Planar maps and trapezoidal decomposition are examples of region-based representation. Alternatively, representations using pixel-accurate rasterized edges have also been used in the art.

In a preferred implementation, each run or region is stored with an associated sequence of one or more operations that describe how to render the run or region, that is, how to generate the values of the rendered pixels. For example, a region or a set of runs representing an object of uniform colour will be associated with an instruction to paint that colour. A region or set of runs representing the area of overlap of two composited objects will be associated with a set of instructions comprising an instruction to paint the first colour of the first object and an instruction to composite the colour of the second object with the painted first colour.

Producing a run-based or pixel-accurate region-based representation of a y-band z-layer by y-band generation task 420-422 can be performed by scan converting the outlines of the objects in the y-band display list 412a-412c. Rather than rasterizing fully into rendered pixel values, intermediate results comprising intersections of object outlines with scan lines can be stored. A region-based approach also involves tracking edges from one scan line to the next and storing the sequence of scan-line intersection points with a region boundary. As each run or region is formed, the set of instructions that would be used to render the run or region is collected and represented as a sequence of operations associated with the run or region.

Merging representations of two (or more) y-band z-layers as performed by YM task 440,441 involves forming the intersection of the runs or regions of one z-layer with the runs or regions of the other. In general, in each area of intersection, the sequence of compositing operations of the two z-layers are concatenated to form the sequence of operations for the merged layer. However, where a run or region in the layer with higher z-order is opaque, that is, the result of merging depends on the upper layer only, the run intersection and compositing operation concatenation is preferably avoided in order to avoid unnecessary spatial fragmentation and to optimize memory usage and performance. In this case, the corresponding run or region in the merged result will only contain the data from the opaque run or region in the z-layer with higher z-order.

In order to produce the final y-banded print job 204 that represents an intermediate representation of an entire page of the printable document 201, one or more YM tasks (e.g., tasks 440-441) may be required. Each YM task typically receives two or more y-banded intermediate layers (e.g., 430) and merges them into a single y-banded representation, which is another y-banded intermediate layer (e.g., 460). This merged y-banded intermediate layer is then stored back into memory 190, as depicted in FIG. 4, in the set of y-banded intermediate layers 432, in anticipation of additional y-band merging. If there are no more y-banded intermediate layers left to merge, the final merge produces the final y-banded print job 204 of a page of the printable document 201 which, as depicted in FIG. 4, may also be stored in memory 190.

The final merged representation format 204 sent to renderer module 205 can be essentially the same as the intermediate representation format. Renderer 205 can produce rendered pixels by taking each run or region and performing the associated sequence of operations to generate pixel values. Often, a renderer is required to produce output in raster order, in which case for a region-based representation, a sequence of active regions for the current output scan line needs to be maintained as rendering progresses from one scan line to the next.

The present disclosure describes methods of scheduling tasks of a multi-threaded application so as to achieve several goals. The goals and the methods are described with reference to the tasks of the builder module 203 described with reference to FIG. 4. To perform this scheduling, the builder module 203 includes the scheduler 450 and the task queue 451. The scheduler 450 performs the operations of creating tasks, adding tasks to the task queue 451, and deciding which task to run on an idle thread, as described in detail later.

Some y-bands may be intersected by very few objects. These are usually marginal y-bands (the first or last y-band on a page), as page margins are usually not heavily painted. The number of objects for such y-bands can be established by a predetermined threshold. If a given y-band is intersected by few objects less than the predetermined threshold so that only a single display list for the y-band is produced, the resulting y-banded layer does not need to be stored in a set of intermediate layers 432 but can be passed directly to the final y-banded print job 204. Such an arrangement is possible because layer merging for the y-band is not required. Furthermore, a YG task processing 420-422 of the y-band display list 412a-412c does not need to produce a y-banded layer but can invoke a renderer module 205 directly, which results in the y-band display list be rendered directly to pixels, skipping any YG task altogether. Such arrangement is possible in an integrated system only. Alternatively, from the thread allocated to the YG task, the rendering routine may simply be called instead of the YG task. Where the number of objects exceeds the predetermined threshold, a different renderer 205 may be selected via an available thread to render the band after multiple intermediate layers have been merged by one or more YM tasks.

(Example Page Description)

The process of splitting a page of graphic objects into y-bands and z-layer stores, will now be described with reference to FIGS. 5A and 5B.

Figure 5A:
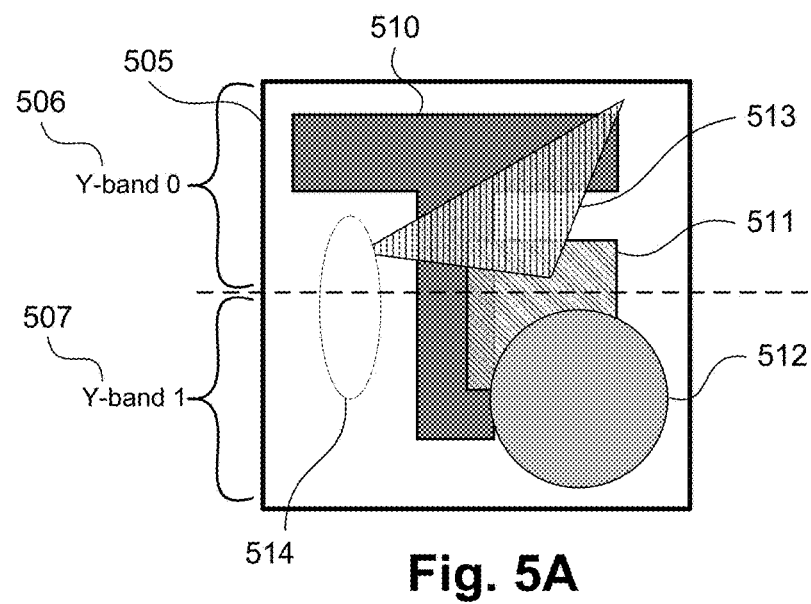
FIG. 5A shows an exemplary page with graphic objects.

FIG. 5A shows a page 505 with five graphic objects, 510-514. Graphic object 510 has the smallest (lowest) z-order, followed by graphic object 511 which has the next highest z-order, followed by graphic object 512, followed by graphic object 513, followed by graphic object 514 which has the highest z-order of all graphic objects 510-514. The page 505 is split into two y-bands 506-507, numbered according to their vertical order on the page. First y-band 506 is numbered y-band 0, while the next y-band, which in this example happens to be the last y-band 507, is numbered y-band 1. More generally, a y-band may be considered interchangeably, a region or space on a print output medium such as paper, actual rendered output, or a memory area that holds different data for a particular y-band.

Figure 5B:
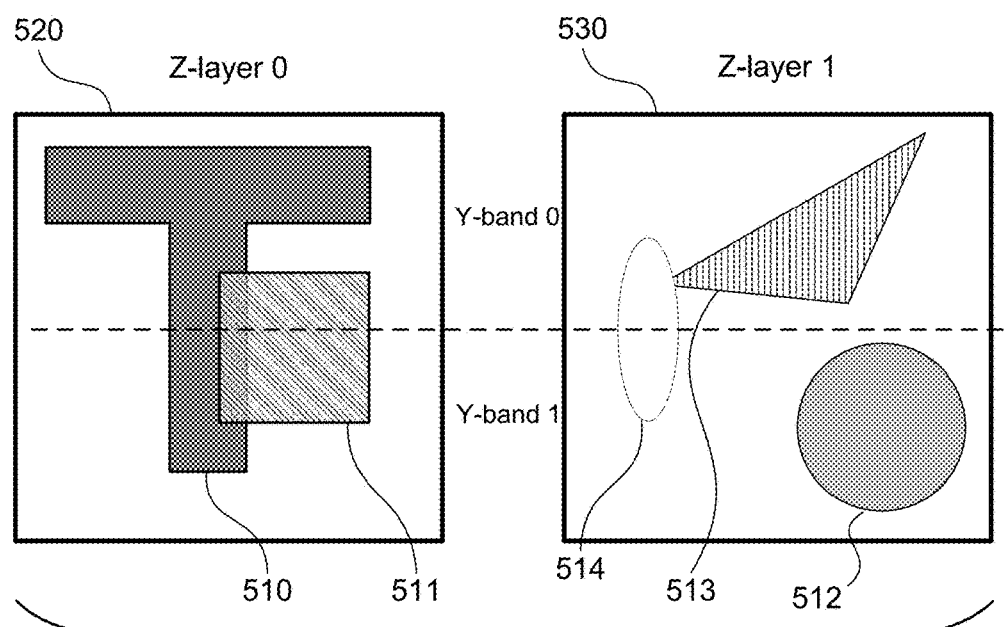
FIG. 5B show the split of the page of FIG. 5A into y-bands and z-layer stores.

Graphic objects 510-514 of the page 505 are split into two z-layer stores 520 and 530 as shown in FIG. 5B. Z-layer store 520 contains the two graphic objects with smallest z-order, being graphic object 510 and graphic object 511. Z-layer store 530 contains the three graphic objects with largest z-order, being graphic object 512, graphic object 513 and graphic object 514. Z-layer stores can also be numbered according to the z-order of their objects on the page. The bottommost z-layer store 520 is numbered z-layer 0, while the next z-layer store, which happens to be the topmost z-layer store 530, is numbered z-layer store 1.

Graphic objects on a page can also be split into y-bands according to spatial boundaries of each of the objects. An object that intersects a given y-band belongs to that y-band. An object that intersects a single y-band only is an object local to that y-band. An object that intersects multiple y-bands is a shared object. Among graphic objects 510-514 of the page 505, objects 510, 511 and 514 are shared objects, while object 513 is local in y-band 0 and object 512 is local in y-band 1.

A display list for a y-band is a data structure for the y-band. A display list for a given y-band refers to a given object if that given object intersects the given y-band. In FIG. 5A, the display list for y-band 0 refers to four objects. Three of the objects referred to by the display list for y-band 0, object 510, object 511 and object 514, are shared objects, while the fourth object 513 referred to by display list for y-band 0 is a local object in y-band 0, i.e. lies entirely within spatial bounds of y-band 0. The display list for y-band 1 refers to four objects. Three of the objects referred to by the display list for y-band 1, object 510, object 511 and object 514, are shared objects while the fourth object 512 referred to by display list for y-band 1 is a local object in y-band 1.

A display list for a given y-band refers to a given z-layer if said display list for the y-band refers to any shared object contained by the given z-layer. In FIG. 5B, the display list for y-band 0 refers to z-layer 0, e.g., via reference to shared object 510, and to z-layer 1, via reference to shared objects 514. The display list for y-band 1 also refers to z-layer 0 and z-layer 1, via references to the same shared objects.

(Data Structures from the Example Page)

The data structures resulting from the process of splitting a page of graphic objects into display lists for each y-band and sharing common objects in z-layer stores will now be described with reference to FIG. 6. The data structures shown in FIG. 6 are for the example of display lists 412 formed by PDLi 402 from the objects of page 505 shown in FIG. 5A.

To optimise the process of releasing y-banded display list and z-layer store memory, the memory (e.g. 190) holding them is arranged into separate memory arenas. In raster image processing, some elements (graphical objects) exist for relatively long periods of time, whereas others exist for shorter periods. For example an object that covers the entire background of a page will exist for the entire time taken to render that page. Conversely, a small object that appears once in a single band, need only exist for a short period. This is managed using the concept of group memory in which the separate memory arenas are associated with element lifetime. This avoids memory fragmentation and thus assists in optimizing memory use. According to the present disclosure, each y-band display list and each z-layer store data is allocated in its own memory arena. With such memory organisation, no memory of objects nor of object pointers need to be freed individually upon releasing a y-band display or a z-layer store. The whole memory arena containing a y-band display list or a z-layer store being released can be freed at once to avoid memory fragmentation and generally improve memory usage pattern. In FIG. 6, dashed rectangles 620 through 623 represent memory arenas corresponding to y-band display lists and z-layer stores. A memory arena corresponding to a given y-band display list may be referred to as a corresponding band memory and holds data comprising (a) object data of objects local to that y-band, e.g. a set of vector edges describing object shapes and fills describing how object shapes are painted, (b) an array of pointers to object data for all objects referred by the corresponding y-band display list, one pointer per one object and (c) a list of z-layer stores to which the y-band display list refers. A memory arena corresponding to a given z-layer store, holds data comprising (a) object data of all shared objects contained in a given z-layer, and (b) a count of y-band display lists referring to the corresponding z-layer store, called the "band count" of the z-layer store.

Figure 6:
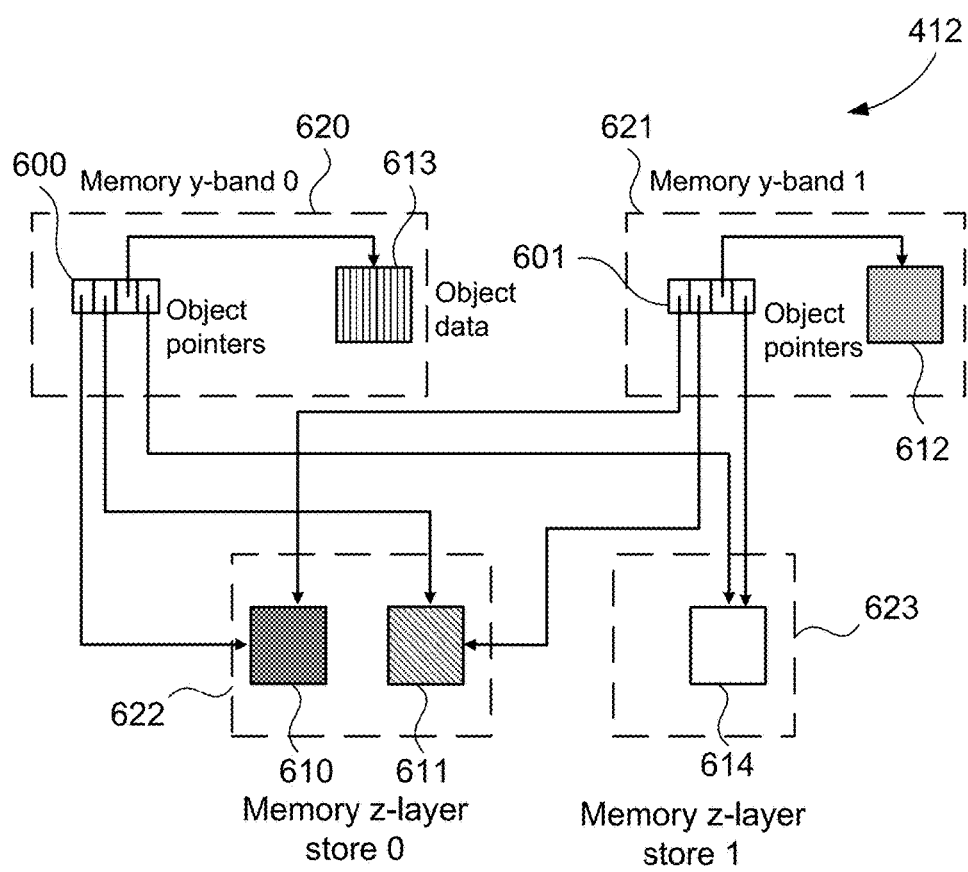
FIG. 6 show resulting memory layout of the data from FIG. 5B.

FIG. 6 shows z-layer store and y-band memory arenas and object pointers and object data of the objects shown in FIG. 5B. Lists of z-layers and band counts are not shown because they will be described later.

Memory arena 622 corresponds to z-layer store 520 and holds object data 610 and 611 of the shared objects 510 and 511 respectively, and may be regarded as a shared memory arena. Memory arena 623 corresponds to z-layer store 530 and holds object data 614 of the shared object 514 and is also a shared memory arena. A shared memory arena stored object shared amongst multiple y-bands. Objects 513 and 512 are not stored in memory arena 623, because they are local in the y-band 0 and y-band 1 respectively. Object data for local objects are held by the memory arena of the corresponding y-band display list the local object intersects.

Memory arena 620 holds data of a display list for y-band 506, i.e., object data 613 of the local object 513 and an array 600 of four references to object data 610, 611, 613 and 614, corresponding to objects 510, 511, 513 and 514 respectively. Memory arena 621 holds data of a display list for y-band 507, i.e., object data 612 of the local object 512 and an array 601 of four references to object data 610, 611, 612 and 614, corresponding to objects 510, 511, 512 and 514 respectively.

(Band Counting and Other Metrics)

A layout of object data in z-layer stores and y-band display lists, and the details of band counting within z-layer stores will now be described with reference to FIG. 7.

The object data in each z-layer store and y-band display list, as well as the array of object data references in each y-band display list, are subject to growth as the PDL document 201 is interpreted. A z-layer store and y-band display list that are in the process of growing are called the active z-layer store and active y-band display list respectively. In FIG. 7, as shown in the legend 700, the active z-layer store and the active y-band display lists are shown with dot-dashed rectangles such as rectangle 701. Z-layer stores and y-band display lists that are not active are called completed z-layer stores and completed y-band display lists respectively and are shown with solid line rectangles such as rectangle 706. Closing a z-layer store or y-band display list will refer to identifying it as complete and preventing addition of further objects. For example, a corresponding memory arena of a closed z-layer store or y-band display list, may be marked as read only. During processing of a single page, the builder 203 can have only one active z-layer store per page and one active y-band display list per each y-band on the page.

Z-layer stores and completed y-band display lists are read by YG tasks 421-422, one y-band display list per each YG task. Once a YG task is finished processing, the YG task also decrements the band count value of z-layer stores from the list of z-layer stores to which the y-band display list refers. It may happen that the band count of an active z-layer store is subject to being decremented due to a YG task completion concurrently with being incremented by PDLi 402. The band count value or the band counter determines a number of y-band display lists referencing objects in a particular z-layer store. A band counter is an attribute of each z-layer store.

Figure 7:
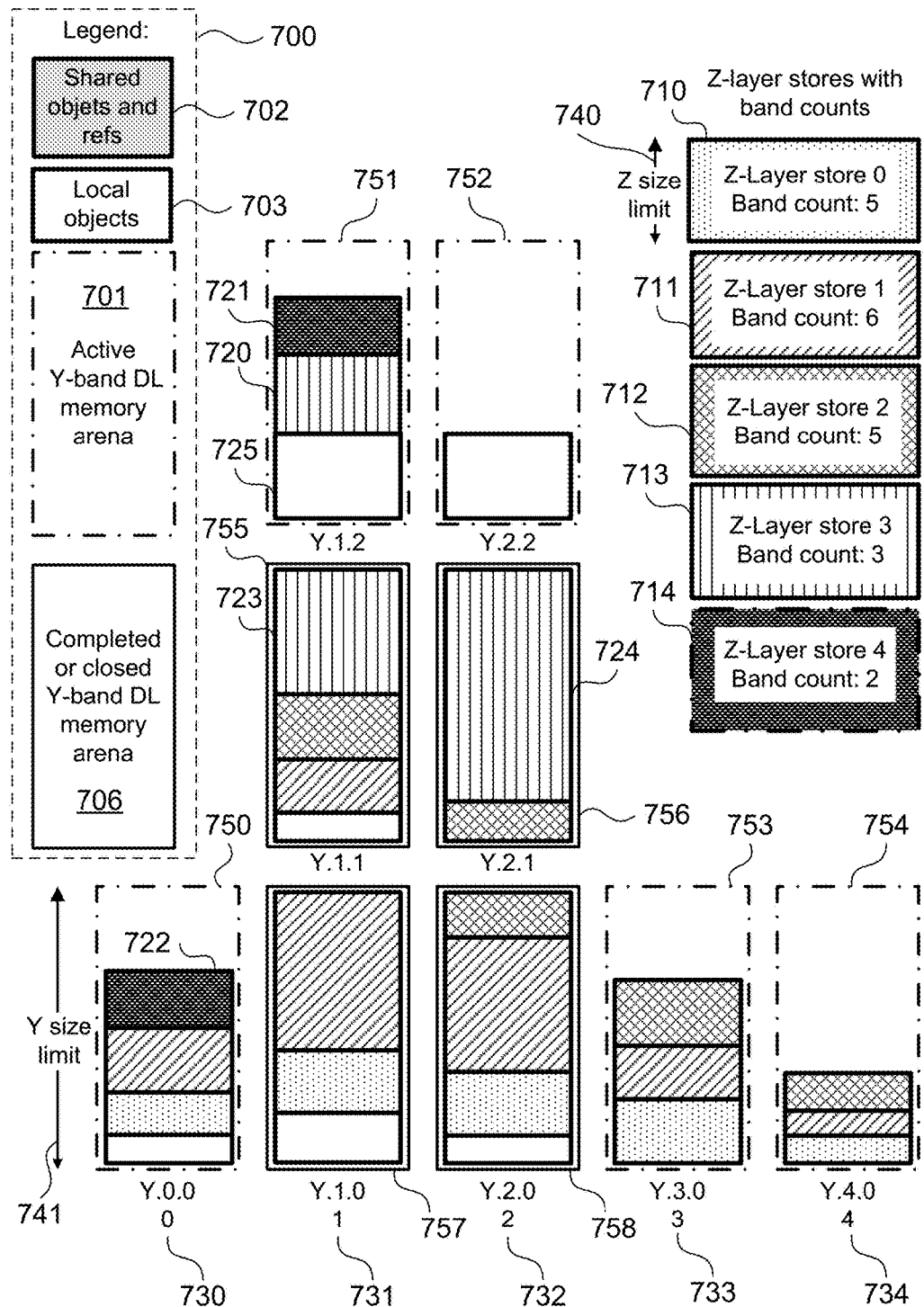
FIG. 7 shows a layout of object data in z-layer stores and y-band display lists, and the details of band counting within z-layer stores.

Object data is marked in FIG. 7 with solid-bordered rectangles, where the area or size of each rectangle is exemplary of a complexity metric such as data size, number of object references, etc., or a combination of such factors. Filled rectangles, such as rectangle 702, represent shared object data in z-layer stores and object references in y-band display lists. Blank rectangles such as rectangle 703, represent local object data.

Rectangles 750 through 758 represent the y-band display lists. The size of rectangles representing a y-band is indicative of the limit of y-band complexity beyond which an active y-band display list is not permitted to grow and is closed as it reaches said limit. Complexity of a y-band is determined as a function of a number of objects contributing to the y-band. Alternatively, the complexity can be determined based on a number of edges intersecting scanlines of the y-band or memory occupied by objects stored in a corresponding y-band store. As such the complexity metric is a form of band attribute metric, where the complexity is an attribute of the band and the complexity metric may be one or a combination of actual size, maximum size, number of objects, and number of edges.

Y-band display lists are marked with pattern Y.b.n, where b is the y-order of the y-band on the page and n is the z-order of the y-band display list within the y-band. For example y-band display list 751 is marked Y.1.2, because it belongs to y-band 1, and its z-order within y-band 1 is 2 (above y-band display lists Y.1.0 and Y.1.1).

In the example illustrated in FIG. 7, there are four completed z-layer stores 710 through 713, and one active z-layer store 714, thereafter referred to by their z-order numbers 0 to 3 and 4 respectively. Memory containing shared object data in a z-layer store and memory for a y-band display list containing references to the shared data are represented by the same hatching pattern. For example, vertically striped rectangles 720, 723 and 724 match the vertically striped pattern of z-layer store 3, thus indicating that the y-band display lists Y.1.2 751, Y.1.1 755 and Y.2.1 756 contain references to shared data in layer store 3. Band counts of z-layer stores, i.e., the number of y-band display lists referencing each z-layer store, are also shown. For example, active z-layer store 4 has a band count of 2 because two y-band display lists Y.0.0 and Y.1.2 refer, as represented by rectangles 722 and 721 respectively, to shared object data stored in z-layer store 4. As another example, completed z-layer store 3 has band count 3 because three y-band display lists Y.1.1, Y.2.1 and Y.1.2 refer, as represented by rectangles 723, 724 and 720 respectively, to shared object data stored in z-layer store 3. In addition to referencing object data in z-layer store 3 and z-layer store 4, y-band display list Y.1.2 holds local object data, as indicated by rectangle 725.

As seen from FIG. 7, Y-band display lists Y.1.0, Y.1.1, Y.2.0 and Y.2.1 are completed, and therefore YG tasks can be scheduled for them. When an active y-band display list such as Y.1.2 reaches its complexity limit, it will be closed and its YG task scheduled. Even though z-layer store 4 is still active (subsequent shared objects can be added to it), active z-layer store 4 is subject to being read concurrently by said YG task because y-band display list Y.1.2 references it. When an active z-layer store (z-layer store 4 in this example) is completed, a new z-layer store is created. Such an event does not trigger a YG task.

In the example of FIG. 7, there are five y-bands 730 through 734, thereafter referred to by their y-order numbers 0 to 4 on the page. Y-band 0 is the highest y-band on a page, while y-band 4 is the lowest band on the page. Y-band display lists are ordered according to age, i.e., z-order, within each y-band—oldest y-band display lists are at the bottom such as y-band display list Y.1.0 while newest y-band display lists are at the top such as y-band display list Y.1.2. Similarly, z-layer stores are ordered according to age or z-order—oldest z-layer store 0 and newest z-layer store 4.

Various complexity metrics can apply to y-band display lists and for z-layer stores. In the preferred implementation, z-layer stores, which hold object data only, can be set to a constant maximum data size, shown on FIG. 7 as "Z size limit" 740. The value of the Z size limit depends on hardware parameters, such as last level cache size, to maximise the efficiency of operations by YG tasks that read shared data. Such a complexity metric is called a size limit metric. For example. the Z size limit can be set to the equal to the size of L3 cache so that all objects in z-layer store can fit into L3 cache. Typically, the size of L3 cache is between 12 MB and 24 MB.

Y-band display lists, which hold object reference and local object data, can be subject to the same size limit complexity metric as z-layer stores—a constant size limit, shown on FIG. 7 as "Y size limit" 741. The application of such a complexity metric results in all y-band rectangles being the same size. The Y size limit can be different from the Z size limit. Usually, the Y size limit is set to be smaller than the Z size limit as shared objects stored in z layer stores tend to be stored in the memory for longer. For example, the Y size limit can be set to the equal to the size of L2 cache. Typically, the size of L2 cache is 1 MB to 4 MB.

In an alternative implementation, y-band display lists can be subject to a different complexity metric. For example, there can be a limit to the number of object references, or the limit can be a measure of total complexity in referenced object data, such as the total number of splines or spline segments, maximum number of edges crossing any scan line, etc. In such complexity measure, the shared objects contribute to all y-bands that reference shared object or the contribution of shared objects is split based on the total number of splines or spline segments the shared objects contribute to the particular y-band.

In yet another implementation, the complexity limiting strategy can vary the Y size limit metric that applies to different y-bands. For example, when the number of references and objects in the first few y-bands (e.g., y-band 0 in FIG. 7) can be determined or precomputed in advance, the limit for y-band display list Y.0.0 can be set as to ensure that all object references and local objects can fit within the single y-band display list Y.0.0, i.e., there will be no multiple separate YG tasks for y-band 0. One way to determine the number of references and objects in a given y-band is to run PDLi in two passes. First pass determines the object bounding boxes and determines the number of local and shared objects in each band. Second pass proceeds with the building of Display List 412. Such an arrangement can make possible fast processing of the first y-band of a page and consequently fast first page out time (FPOT) and will be described in detail later.

Note that some y-band display lists, such as Y.0.0, that do not reach the Y size limit during PDLi of the page, can bypass the generation of intermediate y-band data and are rendered straight to pixels when the y-band is closed at the end of PDLi. Also the Y size limit may be adjusted for certain y-bands. This is especially the case when the number of object references and objects in each y-band is known or can be precomputed in advance. In such cases, the Y size limit may be changed for certain y-bands to avoid multiple YG tasks there.

(Shared z-layer Lists)

The z-layer lists of selected y-band display lists from FIG. 7, will now be described with reference to FIG. 8.

Figure 8:
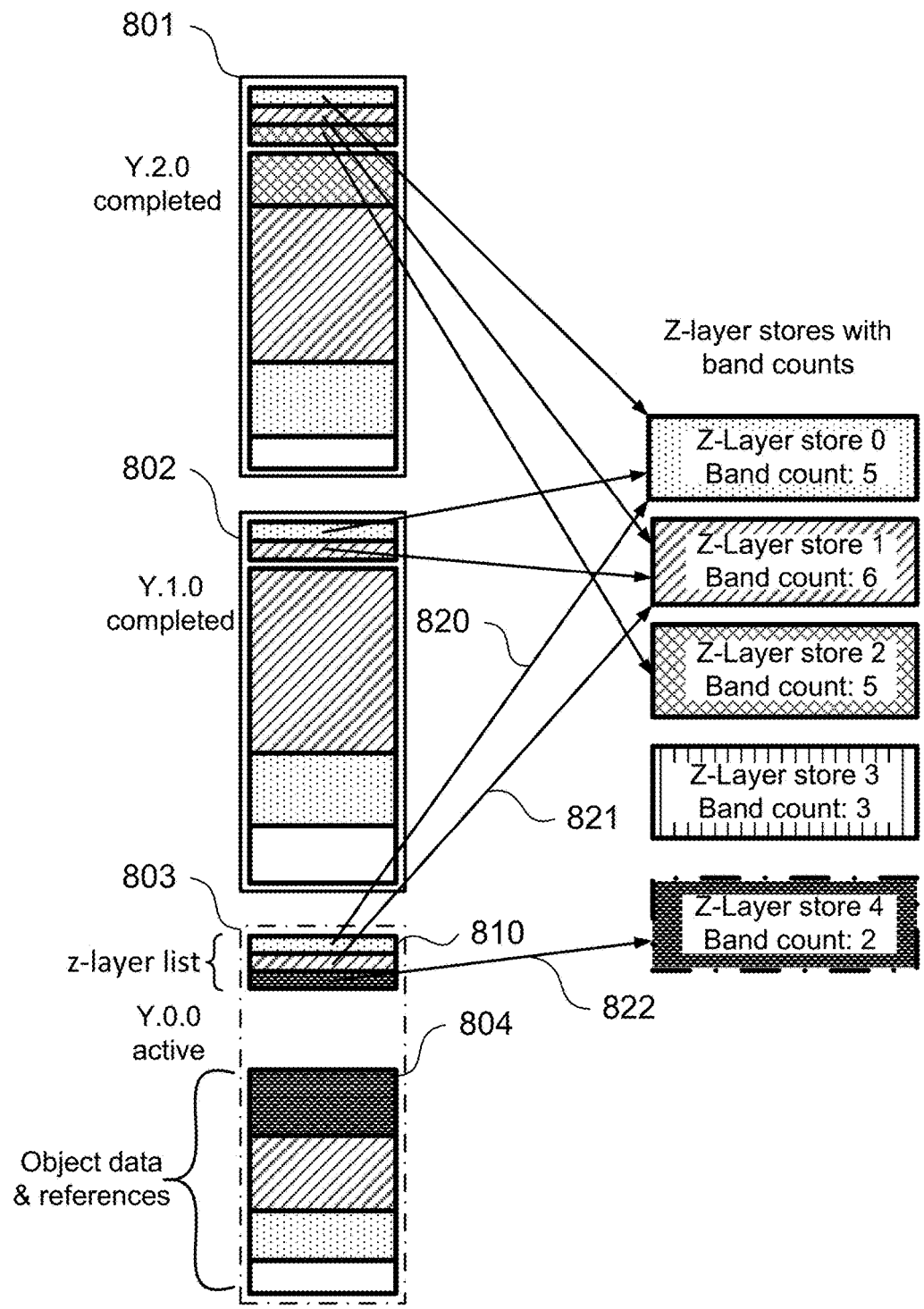
FIG. 8 shows details of shared z-layer lists held by y-bands.

Three y-band display lists from FIG. 7 are shown in FIG. 8—completed y-band display lists 801 and 802 (Y.2.0 and Y.1.0 respectively) and active y-band display list 803 (Y.0.0). In addition to the local objects and shared object references, z-layer lists of each y-band display list are also shown. For example within y-band display list Y.0.0, the set of rectangles 804 represents local object data and object references while the set of rectangles 810 represents the z-layer list.

A z-layer list is simply a list of pointers to z-layer stores which contain shared data referenced by a given y-band display list references shared data, such as the set represented by a set of rectangles 810. The set of rectangles 810 represents the z-layer list of y-band display list Y.0.0 and contains pointers to z-layer store 0 (820), z-layer store 1 (821) and z-layer store 4 (822).

Whenever a reference to a new shared object from an active z-layer store (z-layer store 4 in the example of FIGS. 7 and 8) is added to a y-band display list that does not already have a pointer to the active z-layer store in its z-layer list, then the z-layer list is augmented and a pointer to the active z-layer store is added, and the band count of the active z-layer store is incremented by 1.

Each completed y-band display list holds a metric representing the amount of estimated memory that can be released upon the finish of the corresponding YG task, called herein a memory release metric. This amount can be calculated by summing a global memory metric, i.e. the sizes of all z-layer stores in the z-layer list for the y-band display list, divided by their current band counts, and adding the size of data held in the y-band display list itself, a band attribute metric. The attenuation of z-layer store sizes reflects that other y-band display lists must also be converted by a YG task to release z-layer store data. For example, the memory release metric for y-band display list Y.2.0 will be size of data held in Y.2.0 itself, plus z-layer store 0 size divided by 5 (because the band count of z-layer store 0 is 5), plus z-layer store 1 size divided by 6 (because the band count of z-layer store 1 is 6), plus z-layer store 2 size divided by 5 (because the band count of z-layer store 2 is 5). In some arrangements, the memory release metric is derived from the global memory metric without a need to use the band attribute metric. The memory release metric is used in scheduling the execution of YG tasks and will be described in more detail later.

(Overview of Display List Building)

Figure 9:
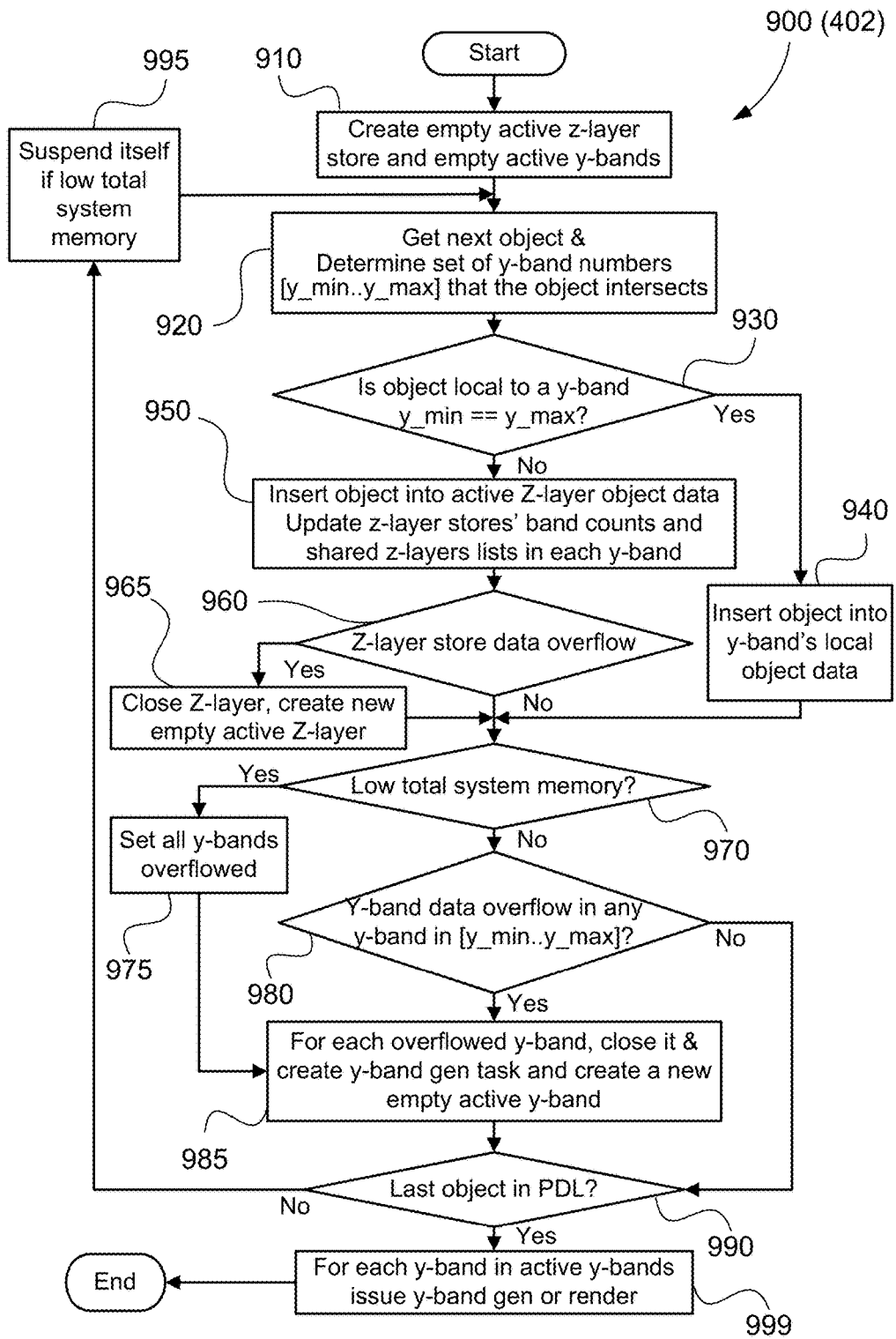
FIG. 9 is a schematic flow diagram illustrating a method of building y-band and z-layer store data structures.

A preferred process 900 of display lists building performed by the PDLi 402 will now be described with reference to the flowchart FIG. 9 which depicts method steps that are desirably implemented in software forming part of the program 181 and executable by the processors 170 of the print system 115.

The process 900 starts with step 910, that creates an empty z-layer store and marks the created z-layer store as active. Then, for each y-band, e.g., y-bands 0 through 4 in FIG. 7, an empty active y-band display list (such as y-band display list Y.0.0. in FIG. 7) is created in step 910.

Then the process 900 enters a loop formed of steps 920 through 995. At the start of each iteration of the loop, step 920 retrieves the next object in z-order from the set of PDL objects and determines the object extents in the y-direction of the page. Step 920 then determines a set of y-bands that the current object intersects, i.e., the set of y-bands overlapping the y-extents of the current object. The set of y-bands are numbered from y_min to y_max in y-band y-order.

Then, a conditional step 930 is executed, where y_min is compared to y_max. If they are determined to be equal, then the current object intersects a single y-band only, i.e., the object is local to that y-band. Where this is the case, execution of the method 900 moves to step 940. Otherwise execution moves to step 950. Both steps 940 and 950 update all metrics that the scheduler 450 relies upon to schedule YG tasks, i.e. z-layer lists and bands counts. From step 950, the execution moves to conditional step 960.

Step 940 inserts the object into object data for the active y-band display list at y-band number y_min and adds the reference to the object data into a reference table of the active y-band display list. Execution then advances to step 970, skipping step 960.

Step 950 inserts the object into the object data of the active z-layer store. Then, for each active y-band display list in the list of y-bands from y_min to y_max, step 950 adds a reference to the object data into the reference table of the active y-band display list. In addition, if this is the first non-local object in a given z-layer store referenced from any y-band display list, the band count of the active z-layer store is incremented and the active z-layer store is added to the list of referenced z-layer stores in the y-band display list. Execution then moves to step 960.

Step 960, where executed, tests if too many objects have been added to the current active z-layer store, resulting in memory overflow. In one implementation, the condition can be a check if the number of objects in the active z-layer store has reached a predetermined number. In an alternative approach, step 960 can test if the amount of memory occupied by object data in the active z-layer store has reached a given limit (e.g., 1 MB). The limit can be chosen according to the memory cache size in the target system 115. In such an implementation, each z-layer store takes the same amount of memory. Where a z-layer store, being a shared memory is closed when the threshold is reached, the store can be marked as read only.

If step 960 returns affirmative, meaning the memory is expect to or has overflowed, step 965 is executed. Step 965 closes the active z-layer store and creates a new empty active z-layer store.

Where the z-layer store has not overflowed (step 960=no) or following either of steps 940 and 965, the execution moves to conditional step 970, which tests if the total memory occupied by all active and closed but not yet processed z-layer stores and y-band display lists plus the amount of working memory taken by active YG and YM tasks is larger than a predetermined total memory usage limit. The predetermined total memory usage limit usually depends on the total available system memory. In other words, if the limit is reached, the system memory has overflowed or the system memory is running low. A memory overflow condition can be established when a predetermined memory threshold is reached, for example equivalent to 90% of the memory available for rendering.

If step 970 returns negative, i.e., adequate memory remains, and a following conditional step 980 is executed. Step 980 tests if any y-band display lists have received too much object data and references as the result of step 940 or 950 previously executed. The condition can be implemented as a check if the number of object references in the active y-band display list has reached the predetermined number such as "Y size limit" in FIG. 7. Alternatively, step 980 can test if the amount of memory occupied by local object data and the object references in the active y-band display list reaches a given limit (e.g., 1 MB). The limit can be chosen according to the memory cache size in the target system. In such an implementation, each y-band display list takes the same amount of memory.

If step 980 returns affirmative for any y-band in the range y_min to y_max, the affected y-band display list is marked as "overflowed" and step 985 is executed. Otherwise step 985 is skipped.

In the case when step 970 returns affirmative, meaning that system memory is overflowed or low, all active y-band display lists are marked as "overflowed" in step 975 and execution similarly moves to step 985. However, there may be some exception to the setting of some y-bands in step 975 as "overflowed", if it can be determined, by examining y-band complexity metrics, that sufficient amount of memory can be recovered by performing y-band generation on the other y-bands. For example, in the case of FPOT strategy (mentioned above) it may be desirably to leave the first few y-band display lists not converted (such as Y.0.0 on FIG. 7), because their y-bands are not intersected by many objects and therefore do not overflow if system memory is not low. This is especially the case when those y-band display lists are simple according to the size limit complexity metric described above and can later be rendered directly to pixels. This only applies to an integrated system, not to a split system. Step 975 marks overflowed y-band display lists so as to convert them to the intermediate representation by triggering the YG tasks in order to recover memory.

Next, step 985 closes all y-band display lists that have been marked as overflowed by one of the previous steps. YG tasks are created for each such y-band display list and the tasks are added to the queue 451. The scheduler 450 (described later) picks up tasks from the queue 451 and schedules tasks for execution. For each closed y-band display list, a new empty y-band display list is created.

Next, step 990, tests if the current object is the last object on the page. If negative, execution loops back to step 995, the final step in the PDLi loop. Step 995 determines if the PDLi thread 402, essentially the method 900, needs to be suspended. Suspension is usually needed due to a low system memory condition detected earlier in step 970. If a low system memory condition was detected, step 995 suspends the PDLi thread 402. Scheduler 450 will resume the PDLi thread 402 later when sufficient memory has been recovered.

If step 990 returns affirmative, the PDLi loop ends and the final step 999 of the method 900 of the PDLi thread 402 is executed.

Step 999 creates the YG tasks, similarly to step 985. However, because this step issues the final YG tasks, the pixel generating tasks can be issued instead of YG tasks for certain y-bands. Only y-bands that did not have any YG task issued yet (i.e., the final YG task would be the only task for the y-band) can be issued pixel generating tasks. Note that pixel generating tasks can be issued in an integrated system only, not in a split system. In such a case, step 999 can perform rendering straight to pixels (bypassing the generation of intermediate y-band data) when there is a single y-band display list in a given y-band.

Figure 10:
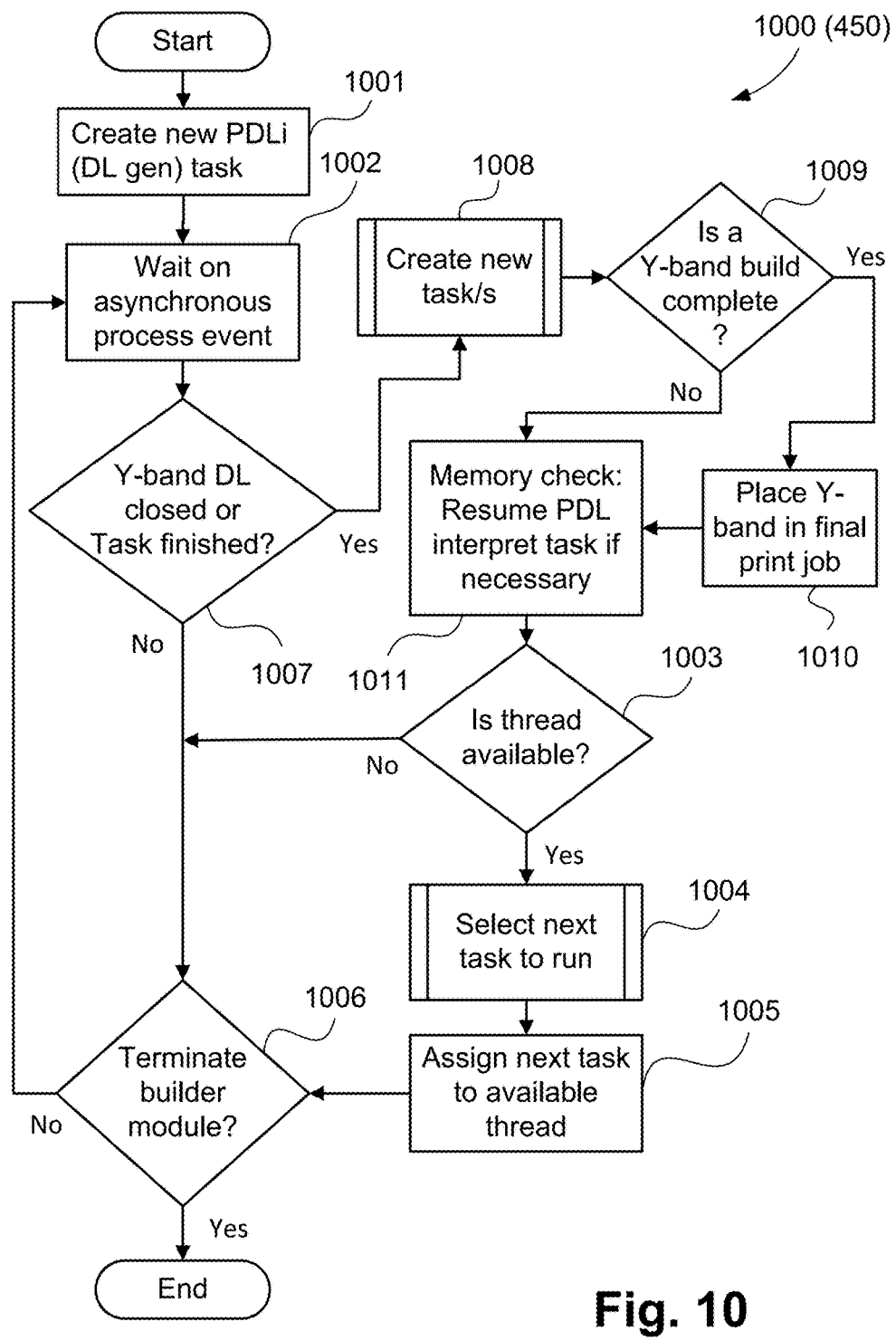
FIG. 10 is a schematic flow diagram illustrating a method of scheduling the tasks of the builder module.

(Overview Scheduling Process Diagram FIG. 10)

A preferred process 1000 of scheduling tasks of the builder module 203, as executed by the scheduler 450, will now be described with reference to FIG. 10.

Scheduler process 1000 starts at step 1001 where a new PDLi task is created and can be immediately executed on thread 402. Process 1000 then proceeds to step 1002 where the process 1000 suspends, waiting for events from the PDLi thread or from other threads, that require scheduling action. On any such event, process 1000 wakes up and proceeds to the step 1007.

Step 1007 determines if the event is that a y-band display list has been closed (e.g., as a result of step 985) or if a task has been finished. In such cases execution moves to sub-process 1008 where new tasks are created as appropriate. Sub-process 1008 will be described later. Otherwise, execution moves to step 1006 where it is determined if all tasks for the current page, including PDLi task and all tasks created in sub-process 1008, have been finished and generation of all intermediate y-banded representation is complete, whereupon the y-band data placed in the final y-banded print job 204.

Step 1006, where affirmative, terminates the method 1000 and thus the builder process 450. The builder module 203 could also terminate, for example, in the event of the printing system 115 has been switched off. Otherwise, control of the process 1000 loops back to step 1002 where process 1000 again waits for an event requiring scheduling action.

After task creation sub-process 1008 is finished, execution moves to step 1009 where a check is performed to determine whether intermediate data is complete for any y-band. If so, step 1010 places the completed y-band data in the final y-banded print job 204. Otherwise, step 1010 is skipped.

Next, process 1000 moves to step 1011 where the total system memory is checked, and, where it is determined that the total system memory is not low and that the PDLi process 402 had been suspended in step 995, then PDLi process 402 is resumed.

Next, process 1000 proceeds to decision step 1003 where it is determined if there is an idle thread available to execute a task from the task queue 451. If there is no idle thread available during the execution of step 1003, process 1000 moves to decision step 1006. If it is determined that there is a thread available, process 1000 executes sub-process 1004 where the next task to run on an available thread is determined. The sub-process 1004 of determining the next task to run will be described later.

Process 1000 then proceeds to step 1005, where the next task to run, determined in sub-process 1004, is assigned to an available thread. Assigning a task to an available thread triggers the execution of the task using one of the controller processors 170. The next task to run is also removed from the task queue 451. Process 1000 then proceeds to decision step 1006, where it is determined if the builder module 203 should terminate. The builder module 203 should terminate, for example, if the printing system 115 has been switched off or all tasks finished and all y-bands scheduled. If it is determined that the builder module 203 should not terminate, process 1000 returns to waiting step 1002.

Figure 11:
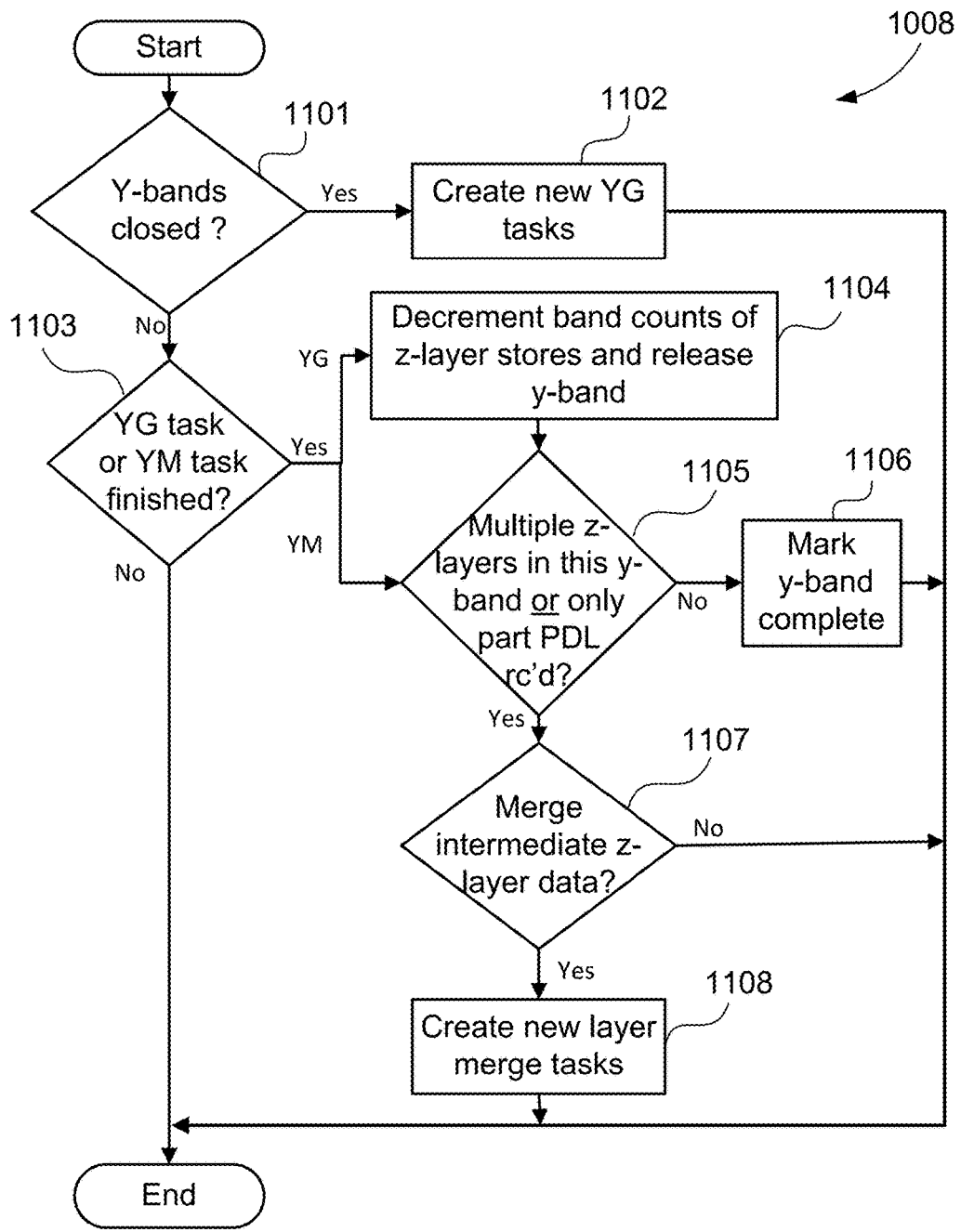
FIG. 11 is a schematic flow diagram illustrating a method of creating new tasks as used in the method of FIG. 10.

(Create New Task/s Process Diagram FIG. 11)

The sub-process 1008 of creating a new task or tasks in response to a task finishing will now be described with reference to FIG. 11.

Sub-process 1008 starts at decision step 1101, where it is determined by the processor 105 if the event (as determined at step 1007 of process 1000) is a closure of some y-band display lists. If it is determined that the event is the closure of some y-band display lists, sub-process 1008 proceeds to step 1102, where new YG task is created for each of the y-band display lists that were closed. This new YG task will generate an intermediate representation of y-band data using the object data held and referenced by the closed y-band display list. In practice, the method 1102 of FIG. 11 provides for where more than one y-band is finished, as many YG tasks are then created. Those tasks then need to be started in step 1004 In step 1102, the new YG task is also added to the task queue 451. Sub-process 1008 then ends upon completion of step 1102 and returns to process 1000.

If it is determined at decision step 1101 that the event is not a y-band display list closure, sub-process 1008 proceeds to decision step 1103 where it is determined by the processor 105 if the event is a finished YG task or a finished YM task. If the event is a finished YG task, then step 1104 is executed. In step 1104, band counts of all z-layer stores referenced by the z-layer list of the y-band display list are decremented by the processor 105, and the memory 106 used by those z-layer stores whose band counts reached 0 is released. The y-band display list is also released in step 1104. Step 1105 then follows step 1104. If the event determined at step 1103 is a finished YM task, step 1104 is skipped, and processing proceeds to step 1105. In step 1105, the processor 105 operates to determine if the y-band to which the YG or YM task belongs has multiple intermediate z-layers, or if not all (only part) of the PDL input has been received. If all the PDL input has not been received, then it is possible that the y-band may have multiple intermediate z-layers, because any not-yet received data may result in an extra z-layer. Therefore, it is important to check both conditions to ensure there is only one y-band z-layer at the end of interpretation. Y-bands intersected by few objects will typically only have one intermediate z-layer produced, while y-bands intersected by many objects will typically have multiple intermediate z-layers produced. If multiple intermediate z-layers are produced in a y-band but not yet merged, the intermediate data produced by each y-band display list's YG task will need to be merged by one or more YM tasks.

If it is determined at step 1105 that either not all PDL input has been received or there are multiple y-band layers for the y-band for which the YG task finished, processing proceeds to decision step 1107 where it is determined if multiple y-band layers of intermediate data have been produced by this y-band, and if that data needs to be merged now. This decision of step 1107 may be based on several factors, including the number of y-band layers 432 with consecutive z-orders that have previously been generated for this y-band, the amount of memory available, and whether there are other tasks for the page that are yet to finish. If other tasks for the page are complete, merging must take place in order to progress the processing of the page towards the final y-banded print job 204. If it is decided at step 1107 that y-band layers should be merged, sub-process 1008 proceeds to step 1108 where a new YM task is created to merge a sequence of y-band layers of intermediate data with consecutive z-orders. The new YM task is also added to the task queue 451 at step 1108. Sub-process 1008 then ends upon completion of step 1108 and returns to the process 1000.

If it is determined at step 1105 that all PDL input has been received and there are no multiple y-band layers on the y-band for which the YG or YM task finished, processing moves to step 1106 where the single y-band layer is marked as complete, ready to be spooled in final y-banded print job 204. Then sub-process 1008 then ends and returns to the process 1000.

If it is determined at step 1107 that y-band layers do not need be merged, sub-process 1008 ends and returns to the process 1000.

If it is determined at step 1103 that the finished task is not a YG task or a YM task, sub-process 1008 ends and returns to the process 1000.

Figure 12:
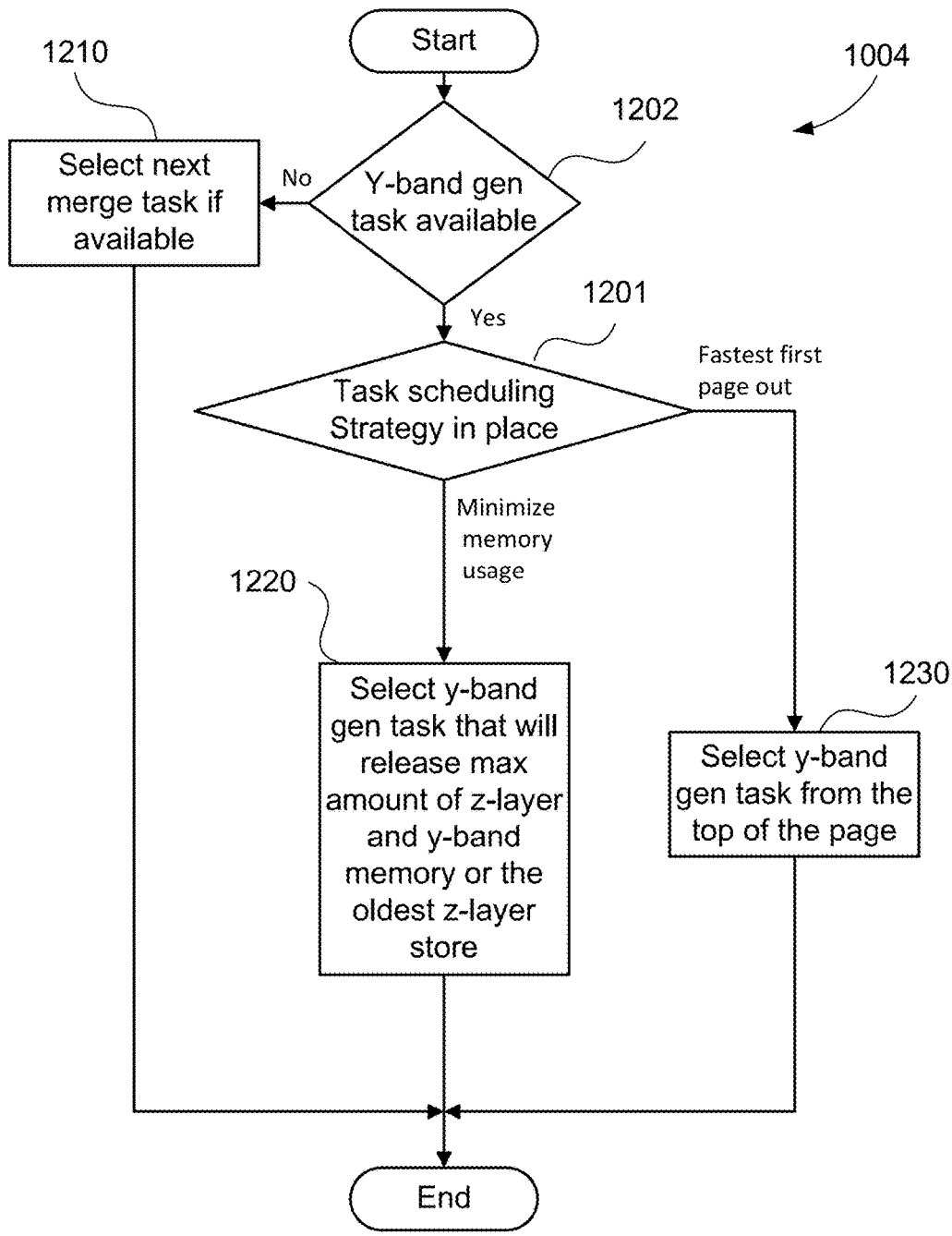
FIG. 12 is a schematic flow diagram illustrating a method of determining the next task to run as used in the method of FIG. 10.

(Determine Next Task to Run FIG. 12)

The sub-process 1004 of determining the next task to run will now be described with reference to FIG. 12.

The sub-process 1004 starts with decision step 1202 in which the processor 105 examines whether the task queue 451 contains one or more YG tasks. If the task queue 451 does not contain any YG tasks, then execution moves to step 1210, where a YM task, if available in the queue 451, is selected by the processor 105. YM tasks can be selected using any suitable strategy, for example, first-come first-served strategy. Where this occurs, the sub-process 1004 then ends and returns to the process 1000.

If the task queue 451 contains one or more YG tasks, execution of the process 1004 then moves to the decision step 1201 which determines which class of scheduling strategy is in place. These are two broad classes of scheduling strategies that can be used in prioritising YG tasks. The first class—minimise memory usage—aims at rasterizing the PDL page within the least amount of memory. The second strategy—fastest first page out—aims at minimising the time taken to output the first page being printed provided there is enough system memory for buffering any data as required. The two goals are often conflicting and the choice of either goal depends on the characteristics of the printing system 100 and the characteristics of the current page. For systems with relatively small amounts of memory, minimising memory usage is typically the default goal, while on systems with ample memory, fastest first page out is generally the default goal. The default scheduling goal for a print system 100 can be configured to change from fastest first page out to minimise memory usage when a low system memory condition is detected in step 970 and remains in place until step 1011 determines that enough memory has been released by YG tasks that converted object data. If decision step 1201 chooses minimize memory usage strategy, then execution moves to step 1220. Otherwise fastest first page out is chosen and execution moves to step 1230.

In step 1230 the processor 105 operates to select the y-band display list from the top of the page (the top-most band), i.e., the y-band display lists belonging to the y-bands that will be printed earlier are selected over the y-bands that will be printed later. That ensures that, for example y-bands 0 and 1 shown in FIG. 7 will be converted to intermediate representation and placed in the output queue 204 before y-bands 2, 3 and 4. In addition, the optional strategy of not closing y-band display list Y.0.0 until all objects intersecting that y-bands are processed or until the end of PDLi process (step 999), ensures that y-band 0 will have a single conversion only, and therefore can be converted directly to pixels without the use of an intermediate representation. Keeping track of objects intersecting y-band 0 is the only metric used in this strategy, being part of the complexity band attribute metric discussed above.

In step 1220 the processor 105 selects y-band display list based on a memory release metric, as introduced above. The memory release metric tracks the amount of memory each y-band display list is about to release if it is converted into intermediate data. The released memory consists of the memory arena holding the y-band display list and memory arenas holding referenced z-layer stores to be released because their decremented band count is about to reach zero. The metric also includes a proportion of the memory used by referenced z-layer stores that advance closer to the point where they can be released (when their decremented band count does not yet reach zero). The YG tasks are prioritised according to their values of the memory release metric. The y-band display list with highest value of the memory release metric is selected first. For example, the y-band display list can be for a y-band that holds the largest amount of data or a y-band which references the largest number of z-layer stores. An example of memory release metric calculation based on FIG. 7 will be shown in the tables below. Another method of scheduling that can lead to minimising memory usage is to select a y-band display list from the y-band display lists that reference the oldest z-layer store, i.e.: the z-layer store that is associated with the smallest z-order. Such method does not require keeping track of memory release metrics but only the order of z-layer store numbers in shared z-layer list. Prioritising the execution based on the oldest referenced z-layer store ensures that z-layer stores will be released in succession as their referencing y-band display lists are converted.

Upon selection of a YG task based on any strategy, sub-process 1004 ends and returns to the process 1000. A prioritising strategy can change dynamically throughout a lifetime of a page processing job depending on stage of processing and the amount of available memory. For example, at the beginning it may be important to start printing as soon as possible, i.e. a strategy for outputting the first band first is employed. Then, if no memory overflow condition is detected, y-bands are processed based on the amount of memory they can release, taking into account that older z-stores should be released first. If a memory overflow condition is detected, then y-bands which can release more memory are converted to intermediate representations. Finally, if the number of local and shared objects in each band had been determined beforehand, e.g. when PDLi has been run in two passes and the memory taken by data in y-bands and z-layer stores is known, the memory overflow threshold, discussed above, can be set higher (for example 95% of available memory for rasterization) so that the fastest first page out strategy will be used in preference of memory minimise strategy.

Example(s) of Scheduling (Scheduling for Memory Minimisation)

Table 1 below shows how the completed y-band display lists Y.1.0, Y.1.1, Y.2.0 and Y.2.1 illustrated in FIG. 7 are prioritised. It is assumed that none of the completed y-band display lists have been prioritised yet. For simplicity, it is assumed that the size limit for both y-band display lists and z-layer stores is the same, e.g., 1 MB, in which case all memory release metrics shown in the table are in megabytes (MB).

TABLE 1

| z-layer stores | band count 1 | band count 2 | band count 3 | band count 4 |
|---|---|---|---|---|
| Z0 | 5 | 5 | 5 | 4 |
| Z1 | 6 | 5 | 5 | 4 |
| Z2 | 5 | 4 | 3 | 2 |
| Z3 | 3 | 2 | 1 | 0 |
| Z4 | 2 | 2 | 2 | 2 |

| y-band | z-list | metric step 1 | metric step 2 | metric step 3 | metric step 4 |
|---|---|---|---|---|---|
| Y.1.0 | Z0, Z1 | $\frac{11}{30}$ | $\frac{8}{20}$ | $\frac{6}{15}$ | (pri. 3) |
| Y.1.1 | Z1, Z2, Z3 | $\frac{21}{30}$ (pri. 0) | — | — | — |
| Y.2.0 | Z0, Z1, Z2 | $\frac{17}{30}$ | $\frac{13}{20}$ | $\frac{11}{15}$ (pri. 2) | — |
| Y.2.1 | Z2, Z3 | $\frac{16}{30}$ | $\frac{15}{20}$ (pri. 1) | — | — |

Table 1 shows the process of prioritising the y-band display lists for selecting a YG task as performed by step 1220 of FIG. 12, from the example in FIG. 7. The columns of Table 1 entitled band count 1 through band count 4 represent four prioritizing steps (iterations of scheduling). The first five rows of Table 1 show the values of band counts of z-layer stores used at prioritising steps 1-4. The last four rows show, for all completed y-band display lists that have not yet been prioritised:

(i) the names of the y-band display lists being prioritised, titled "y-band",
(ii) the z-layer list of said y-band display lists, titled "z-list", and
(iii) values of memory release metrics, titled "metric step 1" through "metric step 4", at each stage of prioritization. Dashes are shown in Table 1 for the y-band display lists that were prioritised in previous steps and therefore do not need memory release metric calculation.

From this, it will be appreciated that the execution of y-band tasks can be prioritised in such way that shared memory arenas (z-layer stores) referenced fewer number of y-bands (having smaller band counts) are released sooner than those referenced by larger number of y-bands. For example, to release z-layer store Z4, it suffices to render only two y-bands, as opposed to z-layer store Z2 that required rendering of 5 y-bands. This approach promotes quicker release of memory that may be required for rasterizing other bands.

Only the sizes of z-layer stores referenced in z-layer lists are used in the memory release metric calculation above, because the size of completed y-band display lists considered in the table is always equal to the Y size limit (e.g., 1 MB), and therefore does not influence a comparison between any two memory release metric values. Such method of calculation is applicable in a general case when no low system memory condition is detected.

The memory release metrics in last four rows of Table 1 are each calculated as the sum of the sizes of referenced z-layer stores divided by the value from the respective "band count" column. At each step, the y-band display list with the largest release metric is selected and the values in the respective "band count" column of the respective z-layer store rows referenced by the chosen y-band display list are decremented.

In this fashion, the selection of a band for rasterizing is based upon a combination of a band attribute metric and a global memory metric, which together define memory release metric for a particular y-band, i.e. a relative measure of how much memory would be released if that band is rendered compared to rendering other y-bands. The band attribute metric is determined by the number of objects stored locally within the y-band memory or a total number of objects intersecting the y-band stored within the y-band display list. The global memory metric is defined as memory occupied by shared memory arena weighted by the respective band counter for that shared memory arena. For example, if a y-band references two z-layer stores (shared memory arenas), each of the shared memory arenas is associated with a band counter defining how many y-bands reference that shared memory arena. Thus, the global memory metric in this case would be defined by memory occupied by a first shared memory arena divided by the corresponding band counter and memory occupied by a second shared memory arena divided by the band counter for the second shared memory arena. In other implementations, the band attribute metric may be supplemented with or by one or more other band attributes. For example, the complexity metric can be combined with or otherwise to modify the band attribute to revise the priority of the bands.

In the band count column for step 1, the original band counts of z-layer stores are shown. Starting at step 1, in each step n, the memory release metric is calculated for each y-band display list, based on the value in the column band count for step n. Then, a y-band display list with the largest memory release metric is chosen and z-layer stores referenced by the chosen y-band display list have their band count decremented and written to the band count column for step n+1.

In step 1 of prioritization, the memory release metric is calculated for each completed y-band display list as shown in the column of Table 1 labelled "band count 1". The largest metric value of $21/30$ is for y-band display list Y.1.1 ($1/6+1/5+1/3=21/30$). Therefore, y-band display list Y.1.1 is chosen with priority 0, and referenced z-layer stores (Z1, Z2 and Z3) have their respective band count values decremented resulting in the values shown in the next band count column.

In step 2, the memory release metric is the largest for y-band display list Y.2.1 ($1/4+1/2=15/20$). Therefore, y-band display list Y.2.1 is chosen with priority 1, and referenced z-layer stores (Z2 and Z3) have their respective band count values decremented resulting in the values shown in the next band count column.

In step 3, the memory release metric is the largest for y-band display list Y.2.0 ($1/5+1/5+1/3=11/15$). Therefore, y-band display list Y.2.0 is chosen with priority 2, and referenced z-layer stores (Z2 and Z3) have their respective band count values decremented as shown in the next band count column.

In step 4, y-band display list Y.1.0 is chosen with priority 3, for which memory release metric does not need to be calculated as it the last remaining completed y-band display list.

Therefore, the completed y-band display lists from FIG. 7, are prioritised Y.1.1, Y.2.1, Y.2.0, Y.1.0 based on the memory release metric strategy.

A variant of the memory release metric may involve all y-band display lists, including those y-band display lists that are not overflowed (e.g., y-band display list marked active in FIG. 7). In prioritising the y-band display lists that are not overflowed (such as y-band display list Y.2.2 on FIG. 7), the amount of memory taken by y-band display lists' local objects and references need to be taken into account as the amount of that memory varies.

TABLE 2

| z-layer stores | band count 1 | band count 2 | band count 3 | band count 4 | band count 5 | band count 6 | band count 7 |
|---|---|---|---|---|---|---|---|
| Z0 | 5 | 5 | 5 | 5 | 4 | 3 | 2 |
| Z1 | 6 | 5 | 5 | 5 | 4 | 3 | 2 |
| Z2 | 5 | 4 | 3 | 3 | 2 | 1 | 1 |
| Z3 | 3 | 2 | 1 | 0 | 0 | 0 | 0 |
| Z4 | 2 | 2 | 2 | 1 | 1 | 1 | 1 |

| y-band | z-list | metric step 1 | metric step 2 | metric step 3 | metric step 4 | metric step 5 | metric step 6 | metric step 7 |
|---|---|---|---|---|---|---|---|---|
| Y.1.0 | Z0, Z1 | $\frac{11}{30}+1$ | $\frac{8}{20}+1$ | $\frac{2}{5}+1$ | $\frac{2}{5}+1$ | $\frac{1}{2}+1$ | $\frac{5}{3}+1$ (pri. 5) | — |
| Y.1.1 | Z1, Z2, Z3 | $\frac{21}{30}+1$ (pri. 0) | — | — | — | — | — | — |

TABLE 2-continued

| | | band 1 | band 2 | band 3 | band 4 | band 5 | band 6 | band 7 |
|---|---|---|---|---|---|---|---|---|
| Y.2.0 | Z0, Z1, Z2 | $\frac{17}{30}+1$ | $\frac{13}{20}+1$ | $\frac{11}{15}+1$ | $\frac{11}{15}+1$ | $1+1$ (pri. 4) | — | — |
| Y.2.1 | Z2, Z3 | $\frac{16}{30}+1$ | $\frac{15}{20}+1$ (pri. 1) | — | — | — | — | — |
| Y.1.2 | Z3, Z4 | $\frac{25}{30}+\frac{3}{4}$ | $1+\frac{3}{4}$ | $\frac{3}{2}+\frac{3}{4}$ (pri. 2) | — | — | — | — |
| Y.2.2 | | $0+\frac{1}{3}$ | $0+\frac{1}{3}$ | $0+\frac{1}{3}$ | $0+\frac{1}{3}$ | $0+\frac{1}{3}$ | $0+\frac{1}{3}$ | $0+\frac{1}{3}$ |
| Y.3.0 | Z0, Z1, Z2 | $\frac{17}{30}+\frac{2}{3}$ | $\frac{13}{20}+\frac{2}{3}$ | $\frac{23}{15}+\frac{2}{3}$ | $\frac{23}{15}+\frac{2}{3}$ (pri. 3) | — | — | — |
| Y.4.0 | Z0, Z1, Z2 | $\frac{17}{30}+\frac{1}{3}$ | $\frac{13}{20}+\frac{1}{3}$ | $\frac{23}{15}+\frac{1}{3}$ | $\frac{23}{15}+\frac{1}{3}$ | $1+\frac{1}{3}$ | $\frac{5}{3}+\frac{2}{3}$ | $2+\frac{2}{3}$ (pri. 6) |

Such method of calculation can be applicable if low memory condition happens ("yes" branch of step 970). In such a case all active y-band display lists are marked closed (step 975).

Table 2 above shows the process of prioritising all y-band display lists from FIG. 7 with the exception of y-band display lists Y.0.0, because it was established that y-band 0 will not exceed the Y size limit and therefore its conversion should be delayed until final step 999.

Table 2 is expanded by four rows showing four active y-band display lists from FIG. 7. The memory release metric cells in Table 2 now show the sum of two terms. The first term includes the same value as in previous table, the sizes of z-layer stores referenced in z-layer lists. The second term includes the y-band display list size (1 for completed y-band display lists and a proportional fraction for active y-band display lists). Table 2 has been expanded to seven prioritising steps (columns titles band count 1 through band count 7).

As the result of including all y-band display lists into the process of prioritising, the priority order has changed. This is because there are more y-band display lists to prioritise and the y-band display list memory sizes differ for y-band display lists in FIG. 7. The priority order as calculated in Table 2 is Y.1.1, Y.2.1, Y.1.2, Y.3.0, Y.2.0, Y.1.0, Y.4.0 and Y.2.2. Table 2 further demonstrates including y-band sizes in the memory release metric.

(Scheduling for Fastest First y-band Out)

When fastest first y-band strategy is in place, the YG tasks are scheduled according to the position of their y-band on the page then their z-number, the top-of-the page and lowest z-number band first. Therefore, in the example from Table 1, y-band Y.1.0 receives priority 0, followed by y-bands Y.1.1 (priority 1), Y.2.0 (priority 2) and Y.2.1 (priority 3). Memory release metrics and band counts are again taken into account while determining y-band task priority order.

INDUSTRIAL APPLICABILITY

The arrangements described are applicable to the computer and data processing industries and particularly for the parallelised rendering of images and documents for printing.

The foregoing describes only some embodiments of the present invention, and modifications and/or changes can be made thereto without departing from the scope and spirit of the invention, the embodiments being illustrative and not restrictive.

We claim:

1. A method for managing memory use in a graphics processing system, the method comprising:
   receiving a plurality of objects to be reproduced on an output medium, the output medium being divided into a plurality of bands;
   storing data for objects intersecting a band in a corresponding band memory, wherein the band memory comprises objects falling within said band and references to shared objects, each of the shared objects intersecting more than one band;
   storing the shared objects in a plurality of shared memory arenas, each shared memory arena being associated with a band counter corresponding to the number of bands referencing said shared memory arena, wherein each band is associated with a global memory metric determined based on shared memory arenas storing shared objects referenced in the corresponding band memory and band counters corresponding to said shared memory arenas, wherein the shared objects stored in the plurality of shared memory arenas are not divided at a band boundary;
   determining, using the associated global memory metric, a priority for rasterizing each band;
   selecting a band for rasterizing based on the determined priority;
   rasterizing the selected band using data from the corresponding band memory and plural identified shared memory arenas storing shared objects referenced in said band memory; and
   in response to rasterizing the selected band, decrementing band counters for the identified shared memory arenas thereby to allow release of the shared memory arenas.

2. A method for managing memory use in a graphics processing system, the method comprising:

receiving a plurality of objects to be reproduced on an output medium, the output medium being divided into a plurality of bands;

storing data for objects intersecting a band in a corresponding band memory, wherein the band memory comprises objects falling within said band and references to shared objects, each of the shared objects intersecting more than one band;

storing the shared objects in a plurality of shared memory arenas, each shared memory arena being associated with a data structure storing a band counter corresponding to the number of bands referencing said shared memory arena, wherein the shared objects stored in the plurality of shared memory arenas are not divided at a band boundary;

determining, for at least one band, a plurality of shared memory arenas storing shared objects referenced in the corresponding band memory;

determining a global memory metric for each band based on band counters associated with the determined shared memory arenas;

determining a priority for rasterizing each band based on the determined global memory metric;

selecting a band for rasterizing based on the determined priority;

rasterizing the selected band using data from the corresponding band memory and the determined plurality of shared memory arenas; and in response to rasterizing the selected band, decrementing band counters for the determined shared memory arenas thereby to allow release of the shared memory arenas.

3. The method according to claim 1, wherein the plurality of shared memory arenas comprises a first shared memory arena and a second shared memory arena, the second shared memory arena being allocated when the first memory arena reaches a predetermined threshold, wherein the first memory arena is marked as read only when the predetermined threshold is reached.

4. The method according to claim 1, wherein the selecting a band for rasterizing is further based on a band attribute metric associated with said band, the band attribute metric is determined based on the objects intersecting said band.

5. The method according to claim 1, wherein the priority is based on prioritizing release of those shared memory arenas having a smaller band counter.

6. The method according to claim 1, wherein the selecting a band for rasterizing is further based on a number of objects intersecting said band determined while interpreting a PDL document describing the received plurality of objects.

7. The method according to claim 1, wherein the priority is based on prioritizing rendering of top-most bands.

8. The method according to claim 1, wherein the global memory metric is determined by the total amount of referenced shared memory arenas.

9. The method according to claim 1, wherein the global memory metric is determined based on an associated z-order of corresponding shared memory arenas.

10. The method according to claim 1, wherein a plurality of bands are rasterized in parallel.

11. The method according to claim 1, further comprising rasterizing the selected band in response to detecting that a combined memory allocated to the band memories and the shared memory arenas is above a predetermined threshold.

12. The method according to claim 1, wherein the rasterizing comprises selecting a renderer from a plurality of renderers, wherein a first renderer is selected if the number of objects referred to in the band memory exceeds a predetermined threshold, otherwise, a second renderer is selected.

13. The method according to claim 1, further comprising, in response to rasterizing a band, releasing corresponding band memory and those shared memory arenas for which band counter has reached zero.

14. The method according to claim 12, wherein the first renderer generates an intermediate pixel aligned representation from the object data stored in the corresponding band memory and corresponding shared memory arenas.

15. The method according to claim 12, wherein the second renderer skips the step of generating an intermediate pixel aligned representation and proceeds to pixel generation from an associated display list.

16. A method for managing memory use in a graphics processing system, the method comprising:

receiving a plurality of objects to be reproduced on an output medium, the output medium being divided into a plurality of bands;

storing objects falling within a band in a corresponding local band memory and storing shared objects intersecting said band and at least one other band in at least one shared memory arena, each of the shared objects intersecting more than one band, each shared memory arena being associated with a band counter corresponding to the number of bands referencing said shared memory arena, wherein the local band memory is associated with a data structure storing a shared memory arena identifier of the at least one shared memory arena where the shared objects intersecting the band are stored, wherein the shared objects stored in the at least one shared memory arena are not divided at a band boundary; and prioritizing rasterizing of the bands based on the plurality of shared memory arena identifiers to thereby facilitate release of the at least one shared memory arena.

17. A non-transitory computer readable storage medium having a program recorded thereon, the program being executable by a processor to manage memory use in a graphics processing system, the program comprising:

code for receiving a plurality of objects to be reproduced on an output medium, the output medium being divided into a plurality of bands;

code for storing data for objects intersecting a band in a corresponding band memory, wherein the band memory comprises objects falling within said band and references to shared objects, each of the shared objects intersecting more than one band;

code for storing the shared objects in a plurality of shared memory arenas, each shared memory arena being associated with a band counter corresponding to the number of bands referencing said shared memory arena, wherein each band is associated with a global memory metric determined based on shared memory arenas storing shared objects referenced in the corresponding band memory and band counters corresponding to said shared memory arenas, wherein the shared objects stored in the plurality of shared memory arenas are not divided at a band boundary;

code for determining, using the associated global memory metric, a priority for rasterizing each band;

code for selecting a band for rasterizing based on the determined priority;

code for rasterizing the selected band using data from the corresponding band memory and plural identified shared memory arenas storing shared objects referenced in said band memory; and code, operative in response to rasterizing the selected band, for decrementing band counters for the identified shared memory arenas thereby to allow release of the shared memory arenas.

18. A graphics processing system comprising a processor, a memory coupled to the processor, and a program stored in the memory and executable by the processor to manage memory use in the graphics processing system, the program comprising:

code for receiving a plurality of objects to be reproduced on an output medium, the output medium being divided into a plurality of bands;

code for storing data for objects intersecting a band in a corresponding band memory, wherein the band memory comprises objects falling within said band and references to shared objects, each of the shared objects intersecting more than one band;

code for storing the shared objects in a plurality of shared memory arenas, each shared memory arena being associated with a band counter corresponding to the number of bands referencing said shared memory arena, wherein each band is associated with a global memory metric determined based on shared memory arenas storing shared objects referenced in the corresponding band memory and band counters corresponding to said shared memory arenas, wherein the shared objects stored in the plurality of shared memory arenas are not divided at a band boundary;

code for determining, using the associated global memory metric, a priority for rasterizing each band;

code for selecting a band for rasterizing based on the determined priority;

code for rasterizing the selected band using data from the corresponding band memory and plural identified shared memory arenas storing shared objects referenced in said band memory; and code, operative in response to rasterizing the selected band, for decrementing band counters for the identified shared memory arenas thereby to allow release of the shared memory arenas.

* * * * *